United States Patent
Siomina et al.

(10) Patent No.: US 11,357,052 B2
(45) Date of Patent: Jun. 7, 2022

(54) METHODS AND APPARATUS FOR ADAPTING RANDOM ACCESS CONFIGURATION TO CONTROL INTERRUPTIONS ASSOCIATED WITH SRS CARRIER BASED SWITCHING

(71) Applicant: Telefonaktiebolaget LM Ericsson (publ), Stockholm (SE)

(72) Inventors: Iana Siomina, Täby (SE); Muhammad Kazmi, Sundbyberg (SE); Imadur Rahman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 155 days.

(21) Appl. No.: 16/340,347

(22) PCT Filed: Oct. 10, 2017

(86) PCT No.: PCT/EP2017/075874
§ 371 (c)(1),
(2) Date: Apr. 8, 2019

(87) PCT Pub. No.: WO2018/069361
PCT Pub. Date: Apr. 19, 2018

(65) Prior Publication Data
US 2019/0254076 A1  Aug. 15, 2019

Related U.S. Application Data

(60) Provisional application No. 62/406,655, filed on Oct. 11, 2016.

(51) Int. Cl.
*H04W 72/08*   (2009.01)
*H04W 74/08*   (2009.01)
(Continued)

(52) U.S. Cl.
CPC .......... *H04W 74/0833* (2013.01); *H04L 5/00* (2013.01); *H04L 5/0048* (2013.01); *H04W 24/10* (2013.01);
(Continued)

(58) Field of Classification Search
CPC .............................. H04W 72/08; H04W 24/10
See application file for complete search history.

(56) References Cited

U.S. PATENT DOCUMENTS

| 2014/0369242 A1 | 12/2014 | Ng et al. | |
| 2016/0242184 A1* | 8/2016 | Dinan | H04W 74/08 |

(Continued)

FOREIGN PATENT DOCUMENTS

| JP | 2016-524881 A1 | 8/2016 |
| WO | 2014/204202 A1 | 12/2014 |
| WO | 2015147736 A1 | 10/2015 |

OTHER PUBLICATIONS

Qualcomm Incorporated: "Details for SRS and PRACH switching and transmission", 3GPP; R1-1609983 (Year: 2016).*

(Continued)

*Primary Examiner* — Sulaiman Nooristany
(74) *Attorney, Agent, or Firm* — Baker Botts, LLP

(57) ABSTRACT

There is provided a method in a User Equipment for performing a random access procedure is provided. The method comprises receiving a request to switch a Reference Signal, RS, transmission to a serving cell. The method further comprises adaptively performing a random access procedure over the serving cell by restricting a maximum number of random access re¬transmissions to the serving cell in relation to the RS switch. There is also provided a method in a network node, a user equipment and a network node.

18 Claims, 15 Drawing Sheets

(51) Int. Cl.
  *H04L 5/00* (2006.01)
  *H04W 74/00* (2009.01)
  *H04W 76/27* (2018.01)
  *H04W 24/10* (2009.01)
  *H04W 72/04* (2009.01)

(52) U.S. Cl.
  CPC ......... *H04W 74/008* (2013.01); *H04W 76/27* (2018.02); *H04W 72/0453* (2013.01)

(56) References Cited

U.S. PATENT DOCUMENTS

2017/0302419 A1* 10/2017 Liu ..................... H04W 72/042
2018/0124825 A1*  5/2018 Lee ..................... H04W 74/006
2020/0266908 A1*  8/2020 Qian ................... H04L 27/2613

OTHER PUBLICATIONS

3GPP TSG-RAN WG1 Meeting #86; Goteborg, Sweden; Source: Ericsson; Title: Support of non-contention based PRACH transmission over SRS Scell without PUSCH (R1-167484)—Aug. 22-26, 2016.
3GPP TSG RAN WG1 Meeting #86bis; Lisbon, Portugal; Source: Qualcomm Incorporated; Title: Details for SRS an PRACH switching and transmission (R1-1609983)—Oct. 10-14, 2016.
PCT International Search Report for International application No. PCT/EP2017/075874—dated Jan. 3, 2018.
PCT Written Opinion of the International Searching Authority for International application No. PCT/EP2017/075874.
3GPP TSG RAN WG1 Meeting #86; Gothenburg, Sweden; Source: Huawei, HiSilicon; Title: Details on timing advance for SRS on TDD CCs without PUSCH (R1-166129)—Aug. 22-26, 2016.
Korean Intellectual Property Office, Notice of Preliminary Rejection, Korean Patent Application No. 10-2019-7013193—dated Apr. 16, 2020.
3GPP TSG-RAN2 Meeting #95bis; Kaohsiung, Taiwan, Republic of China; Source: Huawei, HiSilicon; Title: High layer impacts on SRS Carrier Based Switching for LTE (R2-166632)—Oct. 10-14, 2016.
3GPP TSG-RAN WG2 #95bis; Kaohsiung, Taiwan, Republic of China; Source: Ericsson; Title: Interruptions due to SRS switching (Tdoc R2-166939)—Oct. 10-14, 2016.
3GPP TSG RAN WG1 #86bis; Lisbon, Portugal; Source: Samsung; Title: Configurations for SRS/RACH Switching (R1-1609029)—Oct. 10-14, 2016.
3GPP TSG-RAN WG1 Meeting #85; Nanjing, China; Source: Nokia, Alcatel-Lucent Shanghai Bell; Title: Discussion on SRS transmission triggering (R1-165282)—May 23-27, 2016.
3GPP TSG-RAN WG1 Meeting #86; Gothenburg, Sweden; Source: Nokia, Alcatel-Lucent Shanghai Bell; Title: SRS switching UE capability (R1-167716)—Aug. 22-26, 2016.
Office Action (Notice of Reasons for Rejection) dated Jun. 16, 2020 by the Japanese Patent Office in Japanese Patent Application No. 2019-519756 with English translation.
Korean Patent Office; Notice of Final Rejection for Korean Patent Application No. 10-2019-7013193 dated Oct. 7, 2020.
EPO Communication Pursuant to Article 94(3) EPC issued for Application No. 17 783 826.5-1215—dated Feb. 17, 2021, 10 pages.
3GPP TSG-RAN WG4 Meeting #80; Ljubljana Slovenia; Source: Nokia, Alcatel-Lucent Shanghai Bell; Title: "RRM impact of SRS switching" (R4-168276), Oct. 10-14, 2016, 3 pages.

* cited by examiner

METHODS AND APPARATUS FOR ADAPTING RANDOM ACCESS CONFIGURATION TO CONTROL INTERRUPTIONS ASSOCIATED WITH SRS CARRIER BASED SWITCHING

PRIORITY

This nonprovisional application is a U.S. National Stage Filing under 35 U.S.C. § 371 of International Patent Application Serial No. PCT/EP2017/075874 filed Oct. 10, 2017 and entitled "Methods and Apparatus for Adapting Random Access Configuration to Control Interruptions Associated with SRS Carrier Based Switching" which claims priority to U.S. Provisional Patent Application No. 62/406,655 filed Oct. 11, 2016 both of which are hereby incorporated by reference in their entirety.

TECHNICAL FIELD

The present disclosure relates, in general, to wireless communications and, more particularly, to methods and apparatus for adapting a random access procedure.

BACKGROUND

Sounding Reference Signals

Sounding reference signals (SRS) are known signals that are transmitted by user equipment (UEs) so that the eNodeB can estimate different uplink (UL)-channel properties. These estimates may be used, for example, for UL scheduling and link adaptation, as well as for downlink (DL) multiple antenna transmission (especially in case of Time Division Duplex (TDD) where the UL and DL use the same frequencies).

FIG. 1 illustrates an UL transmission subframe. The SRS are defined in FIG. 1 and have time duration of a single Orthogonal Frequency Division Multiplexing (OFDM) symbol. SRS can be transmitted in the last symbol of a 1 ms UL subframe, and for the case with TDD, the SRS can also be transmitted in the special slot UpPTS. The length of UPTS can be configured to be one or two symbols.

FIG. 2 illustrates an example for Time Division Duplex, TDD, with 3DL:2UL. More particularly, FIG. 2 illustrates an example with a DL:UL ratio of 3:2 within a 10 ms radio frame. Up to eight symbols may be set aside for SRS.

The configuration of SRS symbols, such as SRS bandwidth, SRS frequency domain position, SRS hopping pattern and SRS subframe configuration are set semi-statically as a part of Radio Resource Control (RRC) information element.

There are two types of SRS transmission in Long Term Evolution (LTE) UL: periodic and aperiodic SRS transmission. Periodic SRS is transmitted at regular time instances as configured by means of RRC signaling. Aperiodic SRS is a one-shot transmission that is triggered by signaling in the Physical Downlink Control Channel (PDCCH).

There are in fact two different configurations related to SRS: cell-specific SRS configuration and UE-specific SRS configuration. The cell-specific SRS configuration in essence indicates what subframes may be used for SRS transmissions within the cell as illustrated in FIG. 2.

The UE-specific SRS configuration indicates to the terminal a pattern of subframes (among the subframes reserved for SRS transmission within the cell) and frequency domain resources to be used for SRS transmission of that specific UE. It also includes other parameters that the UE shall use when transmitting the signal, such as frequency domain comb and cyclic shift.

This means that SRS from different UEs can be multiplexed in the time domain, by using UE-specific configurations such that the SRS of the two UEs are transmitted in different subframes. Furthermore, within the same symbol, SRSs can be multiplexed in the frequency domain. The set of subcarriers is divided into two sets of subcarriers, or combs with the even and odd subcarriers respectively in each such set. Additionally, UEs may have different bandwidths to get additional FDM. The comb enables frequency domain multiplexing of signals with different bandwidths and also overlapping. Additionally, code division multiplexing can be used. Then different users can use exactly the same time and frequency domain resources by using different shifts of a basic base sequence.

SRS Carrier-Based Switching

In LTE networks, there are many kinds of DL heavier traffic, which leads to a greater number of aggregated DL component carriers (CC) than the number of (aggregated) uplink CCs. For the existing UE categories, typical carrier aggregation (CA) capable UEs only support one or two uplink CCs.

For the carrier supporting both UL and DL, transmit diversity based feedback without Precoding Matrix Indicator (PMI) and with SRS is beneficial as channel reciprocity can be used. However, a UE generally has the capability of aggregating a larger number of DL carriers than UL carriers. As a result, some TDD carriers with DL transmission for the UE will have no UL transmission including SRS, and channel reciprocity cannot be utilized for these carriers. Such situations will become more severe with Carrier Aggregation, CA, enhancement of up to 32 CCs, where a large portion of CCs are TDD. Allowing fast carrier switching to and between TDD UL carriers is one approach to allow SRS transmission on these TDD carriers, and should be supported.

SRS carrier-based switching is aiming to support SRS switching to and between TDD CCs, where the CCs available for SRS transmission correspond to the CCs available for CA of Physical Downlink Shared Channel (PDSCH), while the UE has fewer CCs available for CA of Physical Uplink Shared Channel (PUSCH).

Random Access

For the purpose of SRS carrier-based switching, a UE may transmit not only SRS but also Physical Random Access Channel (PRACH), for example to enable UE timing estimation.

The random access (RA) procedure can be either contention-based or non-contention based. Both the contention-based and non-contention based procedures are multi-step procedures. The contention-based and non-contention based random access procedures are described in more detail below in relation to FIGS. 3 and 4, respectively.

FIG. 3 illustrates an example contention-based random access procedure. In contention-based RA, the UE randomly sends a "random access preamble" during the Random Access Channel (RACH) opportunity to the eNode B (eNB). The preamble is selected from a set of those configured for the cell and provided, for example, by means of system information. During the second step, the network responds to the UE with at least a RA preamble identifier, initial uplink grant, etc. in the random access response (RAR) message. During the third step, the UE uses the initial allocation received in the RAR message to transmit further details related to the connection request (also known as message 3 (msg3)). In message 3, the UE also sends its identifier, which is echoed by the eNB in the "contention resolution message" during the fourth and final step. The contention resolution is considered successful if the UE detects its own identity in the contention resolution message. Otherwise, it reattempts RA.

When CA is configured, the first three steps of the contention-based RA procedure occur on the Primary Cell, PCell, while contention resolution (step 4) can be cross-scheduled by the PCell. When dual connectivity (DC) is configured, the first three steps of the contention-based RA procedure occur on the PCell in the Master Cell Group (MCG) and PSCell in the Secondary Cell Group (SCG). When CA is configured in SCG, the first three steps of the contention-based random access procedure occur on the PSCell, while contention resolution (step 4) can be cross-scheduled by the PSCell.

FIG. 4 illustrates an example non-contention based random access procedure. In non-contention based RA, the eNB first assigns a "random access preamble." In the next step, the UE sends the assigned preamble during the RACH opportunity to the eNB. In the last step, the network responds to the UE with at least a RA preamble identifier, initial uplink grant, etc. in the RAR message. The UE uses the initial allocation received in the RAR message to transmit further details related to, for example, handover. In case of non-contention based RA, there is no "contention resolution phase."

RACH Transmission Opportunities

The time-frequency resources where RA can be performed are sent via system information mapped on the broadcast channel for all UEs or on a shared channel for specific UE. One RA opportunity (or resource) is 1.07 MHz wide (6 resource blocks (RBs)) and lasts either for 1 ms or 2 ms, depending on the RACH preamble format. For Frequency Division Duplex (FDD), there may be at most one RA resource per subframe. For TDD, multiple RA opportunities may be spread out over frequency, depending on UL/DL configuration. It is up to the network whether to schedule other data in a RA slot or not. Thus, the network also controls whether RA transmission is orthogonal to shared data transmission or not.

RACH Format and Associated Parameters

The RACH burst in LTE contains a cyclic prefix, the RACH preamble, and a guard interval. The cyclic prefix is in the beginning of the RACH burst and is a copy of the last part of the RACH preamble. The cyclic prefix enables efficient frequency-domain processing of the RACH burst in the eNB RACH receiver. The guard interval accounts for the unknown round trip delay in the cell. Both cyclic prefix and guard interval must be larger than the maximum round trip delay to ensure proper operation.

The LTE standard defines 3 RACH preamble formats:
1. Standard format over 1 ms: The preamble part of the RACH burst is not repeated. The cyclic prefix and guard period are balanced and enable cell sizes of approximately 15 km (only considering round trip delay, not link budget).
2. Format with extended cyclic prefix over 2 ms: This format provides extended cyclic prefix and guard periods but no repetition of the preamble. The cyclic prefix and guard period are balanced and enable cell sizes of approximately 80 to 90 km (only considering round trip delay, not link budget).
3. Repeated preamble format: The preamble is repeated to enable a higher received energy at the receiver.

In general, RA configuration parameters comprise L1 parameters and higher-layer related parameters.

From the physical layer perspective, the L1 RA procedure encompasses the transmission of RA preamble and RAR. The remaining messages are scheduled for transmission by the higher layer on the shared data channel and are not considered part of the L1 random access procedure. Example L1 parameters include, but are not limited to: random access channel parameters (e.g., PRACH configuration and frequency position); and parameters for determining the root sequences and their cyclic shifts in the preamble sequence set for the primary cell (e.g., index to logical root sequence table, cyclic shift, and set type (unrestricted or restricted set)).

SUMMARY

According to a first aspect a method in a User Equipment for performing a random access procedure is provided. The method comprises receiving a request to switch a Reference Signal, RS, transmission to a serving cell. The method further comprises adaptively performing a random access procedure over the serving cell by restricting a maximum number of random access re-transmissions to the serving cell in relation to the RS switch.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The method may further comprise determining a first set of reference time resources in a cell belonging to a first carrier frequency, wherein the serving cell operates on a second carrier frequency. In this embodiment, restricting the maximum number of random access re-transmissions to the serving cell may comprise restricting the maximum number of random access re-transmissions to the serving cell during the determined first set of reference time resources. The first set of reference time resources may be for performing measurements. That is, the first set of reference time resources may be used by the user equipment for performing measurements.

The step of receiving a request to switch RS transmission to a serving cell may comprise receiving one or more RS switching messages via Radio Resource Control, RRC, signaling.

The RS switch may be a carrier-based RS switch.

The reference signal, RS, may be a Sounding Reference Signal, SRS. However, the RS may be any type of reference signal such as but not limited to a Demodulation Reference Signal, DMRS, a UE specific reference signal or a pilot signal.

According to the first aspect there is further provided a method in a network node. The method comprises sending a request to a user equipment, wherein the request comprises a request to switch Reference Signal, RS, transmission to a serving cell. The method further comprises obtaining information about the user equipment's ability to adapt a random access procedure in relation to the Reference Signal, RS, switch, wherein the adaption comprises restricting a maximum number of random access re-transmissions to the serving cell in relation to the RS switch.

The method in the network node may further comprise controlling the user equipment's random access transmissions over the serving cell in relation to the RS switch. This controlling may comprise adapting the random access procedure performed by the user equipment in relation to the RS switch, wherein the adaption comprises restricting a maximum number of random access re-transmissions to the serving cell in relation to the RS switch.

The method in the network node may further comprise determining for the user equipment a first set of reference time resources in a first cell belonging to a first carrier frequency, wherein the serving cell operates on a second carrier frequency.

Sending the request to the user equipment may comprise sending one or more RS switching messages via Radio Resource Control, RRC, signaling.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

According to the first aspect there is further provided a user equipment comprising one or more processors. The one or more processors are configured to receive a request to switch a Reference Signal, RS, transmission to a serving cell. The one or more processors are further configured to adaptively perform a random access procedure over the serving cell by restricting a maximum number of random access re-transmissions to the serving cell in relation to the RS switch.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The one or more processor may be further configured to determine a first set of reference time resources in a cell belonging to a first carrier frequency, wherein the serving cell operates on a second carrier frequency. The one or more processors may be configured to restrict the maximum number of random access re-transmissions to the serving cell during the determined first set of reference time resources. The first set of reference time resources may be for use in performing measurements.

The one or more processors may be configured to receive a request to switch RS transmission to a serving cell by receiving one or more RS switching messages via Radio Resource Control, RRC, signaling.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

According to the first aspect there is further provided a network node comprising one or more processors. The one or more processors are configured to send a request to a user equipment, wherein the request comprises a request to switch Reference Signal, RS, transmission to a serving cell.

The one or more processors are further configured to obtain information about the user equipment's ability to adapt a random access procedure in relation to the Reference Signal, RS, switch, wherein the adaption comprises restricting a maximum number of random access re-transmissions to the serving cell in relation to the RS switch.

The one or more processors may be further configured to control the user equipment's random access transmissions over the serving cell in relation to the RS switch. In particular, the one or more processors may be configured to adapt the random access procedure performed by the user equipment in relation to the RS switch, wherein the adaption comprises restricting a maximum number of random access re-transmissions to the serving cell in relation to the RS switch.

The one or more processors may further be configured to determine for the user equipment a first set of reference time resources in a first cell belonging to a first carrier frequency, wherein the serving cell operates on a second carrier frequency.

In some embodiments, the one or more processors may be configured to send one or more RS switching messages to the user equipment via Radio Resource Control, RRC, signaling.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

According to a second aspect, a method in a user equipment is disclosed. The method may comprises indicating to another node the UE's ability to adapt a random access procedure in relation to reference signal (RS) switching. The method may further comprise determining at least a first set of reference time resources (R1) in at least one cell (cell1) belonging to at least a first carrier frequency (F1). The method further comprises sending one or more random access transmissions on a second carrier frequency (F2) to support RS carrier-based switching, while accounting for the first set of reference time resources (R1). In certain embodiments, one or more of the following may apply:

determining at least a first set of reference time resources (R1) in at least one cell (cell1) belonging to at least a first carrier frequency (F1) may comprise adapting the first set of reference time resources (R1) to one or more of a random access procedure or configuration.

sending one or more random access transmissions on a second carrier frequency (F2) to support RS carrier-based switching may comprise using transmitter resources associated with the first carrier frequency (F1);

the method may comprise indicating to another node that the random access configuration and/or procedure has been adapted.

According to an example embodiment, a user equipment is disclosed. The user equipment comprises one or more processors. The one or more processors may be configured to indicate to another node the UE's ability to adapt a random access procedure in relation to reference signal (RS)

switching. The one or more processors may be configured to determine at least a first set of reference time resources (R1) in at least one cell (cell1) belonging to at least a first carrier frequency (F1). The one or more processors are configured to send one or more random access transmissions on a second carrier frequency (F2) to support RS carrier-based switching, while accounting for the first set of reference time resources (R1).

According to another example embodiment, a method in a network node is disclosed. The method comprises obtaining information about a UE's ability to adapt a random access procedure in relation to reference signal (RS) switching. The method may comprise determining for the UE at least a first set of reference time resources (R1) in at least one cell (cell1) belonging to at least a first carrier frequency (F1). The method comprises controlling one or more of: the UE's random access transmissions on a second carrier frequency (F2) to support RS carrier-based switching; and the UE's operation in the determined first set of reference time resources (R1). In certain embodiments, one or more of the following may apply:

determining for the UE at least a first set of reference time resources (R1) in at least one cell (cell1) belonging to at least a first carrier frequency (F1) may comprise adapting the first set of reference time resources (R1) to one or more of a random access procedure or configuration.

According to another example embodiment, a network node is disclosed. The network node comprises one or more processors. The one or more processors are configured to obtain information about a UE's ability to adapt a random access procedure in relation to reference signal (RS) switching. The one or more processors may be configured to determine for the UE at least a first set of reference time resources (R1) in at least one cell (cell1) belonging to at least a first carrier frequency (F1). The one or more processors are configured to control one or more of: the UE's random access transmissions on a second carrier frequency (F2) to support RS carrier-based switching; and the UE's operation in the determined first set of reference time resources (R1).

Certain embodiments of the present disclosure may provide one or more technical advantages. For example, certain embodiments may reduce the risk of additional interruptions due to random access in relation to RS carrier-based switching. Embodiments may reduce interruptions or in other words the impact on a first set of time resources in a first cell belonging to a first carrier frequency used for radio measurements. Thus, embodiments may reduce degradation of performance of procedures. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, existing approaches to RA can be either contention-based or non-contention based. Existing approaches, however, may have certain deficiencies. For example, the RA procedure used in relation to SRS carrier-based switching may cause additional interruptions in the UE to DL and UL. The present disclosure contemplates various embodiments that may address these and other deficiencies associated with existing approaches.

According to one example embodiment, a method in a UE is disclosed. The UE indicates to another node the UE's ability to adapt a RA procedure in relation to SRS switching. The UE determines at least a first set of reference time resources (R1) in at least one cell (cell1) belonging to at least a first carrier frequency (F1). In certain embodiments, determining at least the first set of reference time resources (R1) may comprise adapting the first set of reference time resources (R1) to one or more of a RA procedure or configuration. The UE sends one or more RA transmissions on a second carrier frequency (F2) to support SRS carrier-based switching, while accounting for the determined first set of reference time resources (R1). In certain embodiments, sending the one or more RA transmissions on the second carrier frequency (F2) may comprise using transmitter resources associated with the first carrier frequency (F1). In certain embodiments, the UE may indicate to another node that the RA configuration and/or procedure has been adapted.

According to another example embodiment, a method in a network node is disclosed. The network node obtains information about a UE's ability to adapt a RA procedure in relation to SRS switching. The network node determines for the UE at least a first set of reference time resources (R1) in at least one cell (cell1) belonging to at least a first carrier frequency (F1). In certain embodiments, determining for the UE at least a first set of reference time resources (R1) may comprise adapting the first set of reference time resources (R1) to one or more of a random access procedure or configuration. The network node controls one or more of: the UE's RA transmissions on a second carrier frequency (F2) to support SRS carrier-based switching; and the UE's operation in the determined first set of reference time resources (R1)

Certain embodiments of the present disclosure may provide one or more technical advantages. For example, certain embodiments may reduce the risk of additional interruptions due to random access in relation to SRS carrier-based switching. Other advantages may be readily apparent to one having skill in the art. Certain embodiments may have none, some, or all of the recited advantages.

Figure 1:
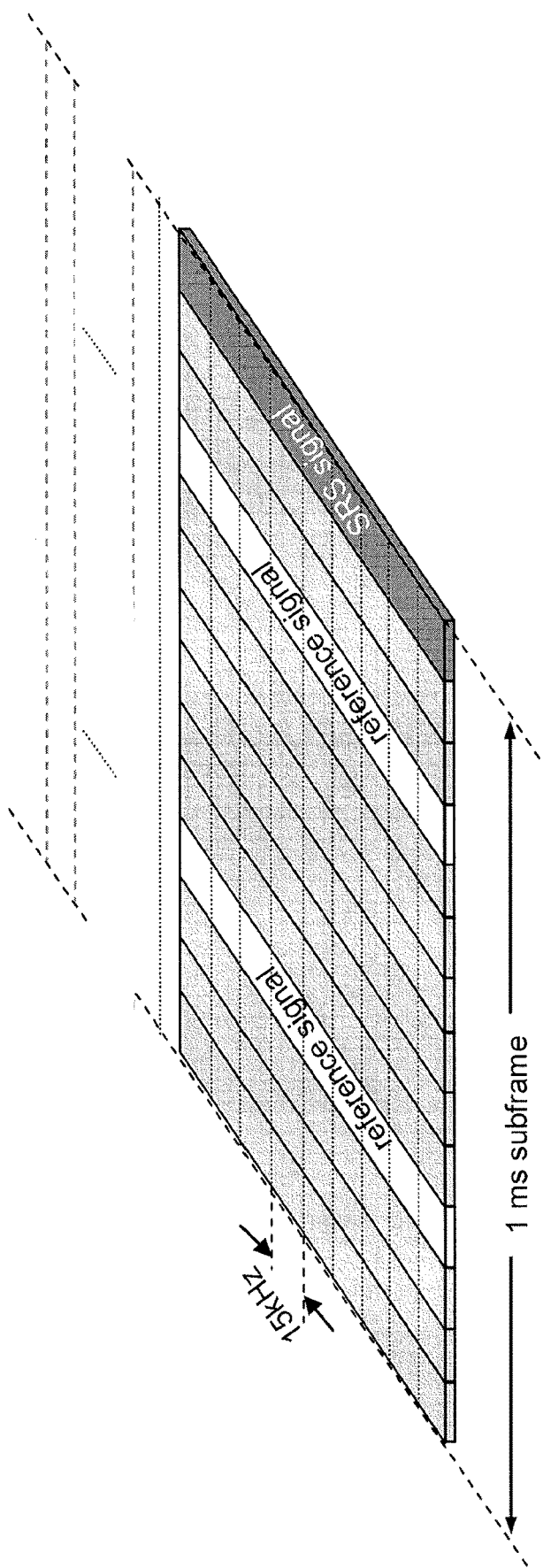
FIG. 1 illustrates an UL transmission subframe.
Figure 2:
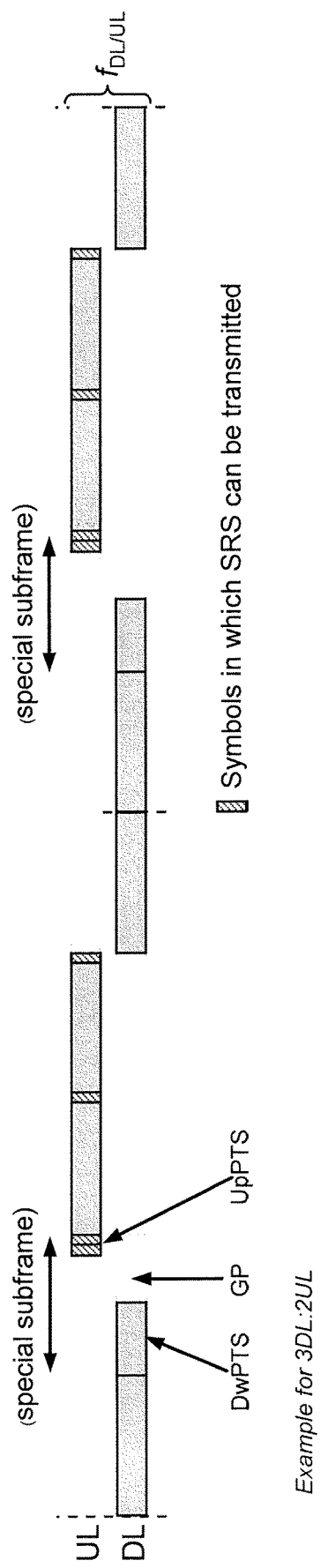
FIG. 2 illustrates an example for TDD with 3DL:2UL.
Figure 3:
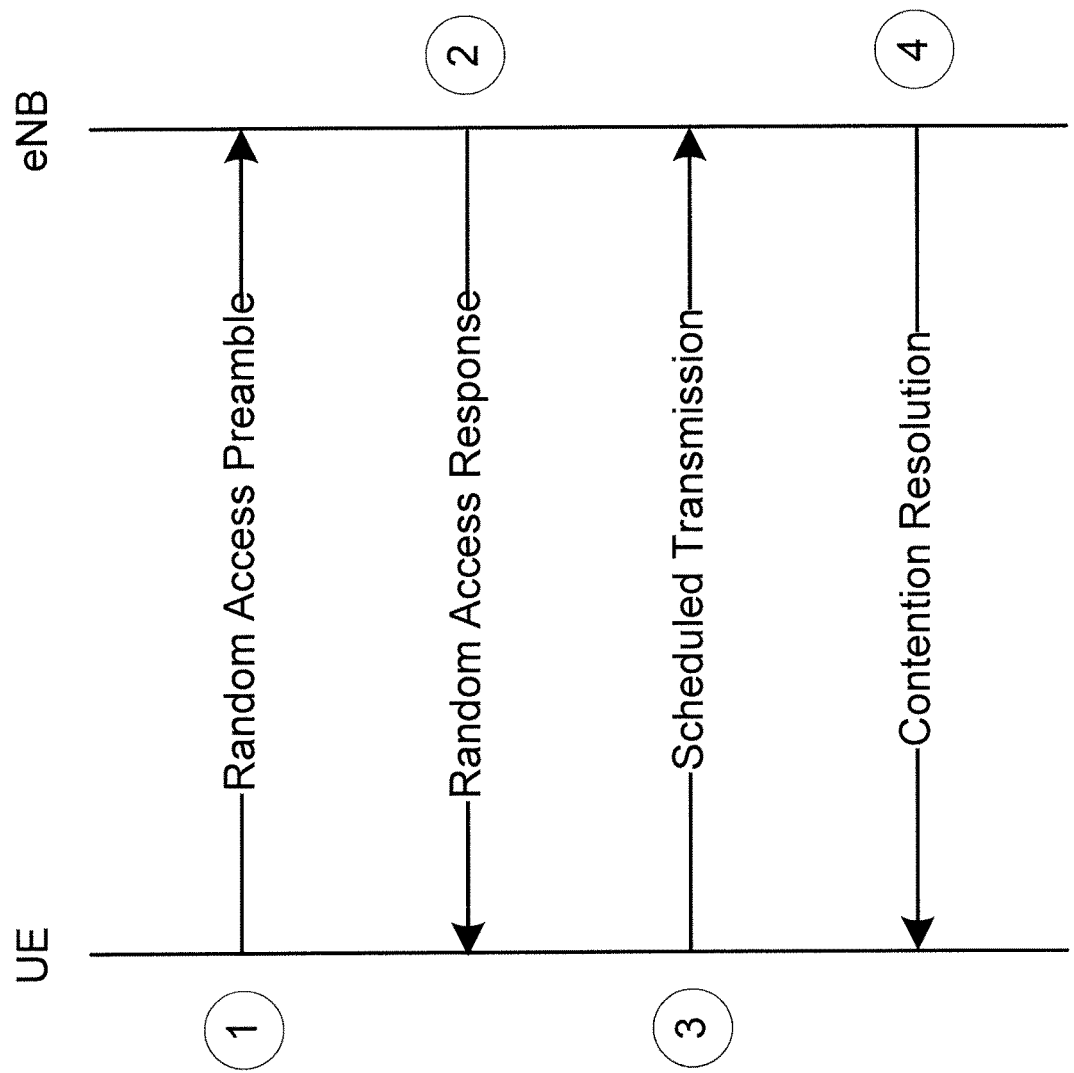
FIG. 3 illustrates an example contention-based random access procedure.
Figure 4:
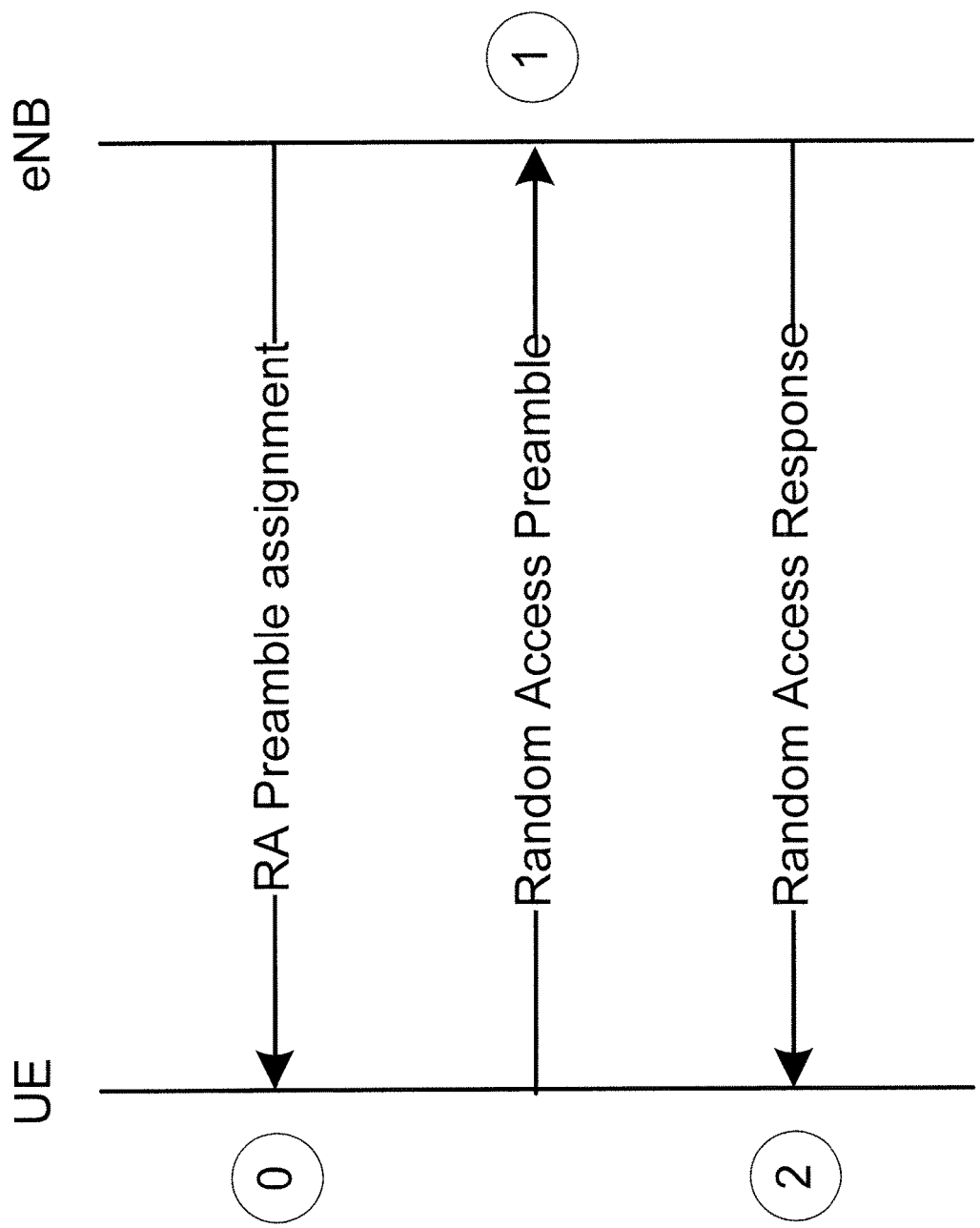
FIG. 4 illustrates an example non-contention based random access procedure.
Figure 5:
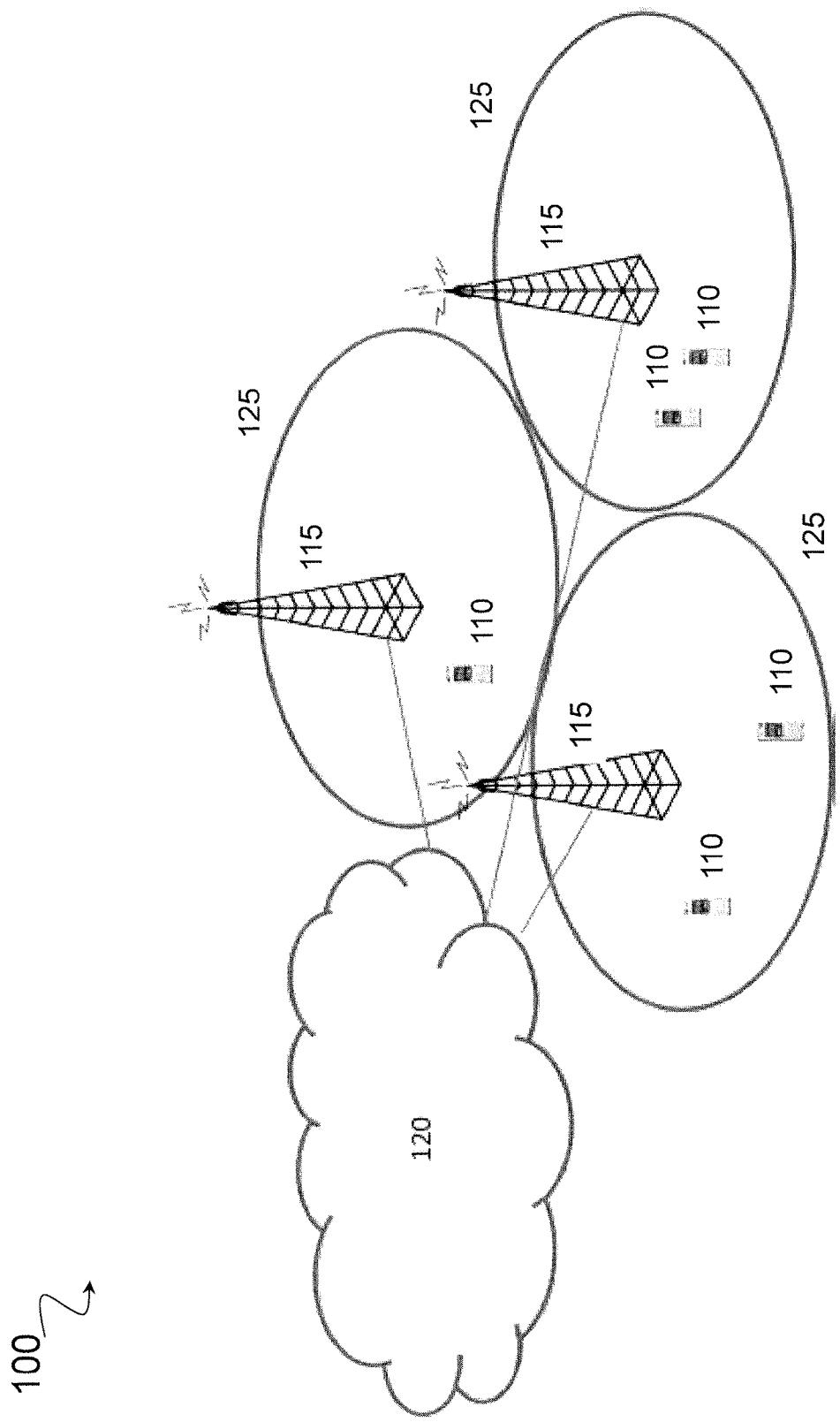
FIG. 5 is a schematic diagram of an exemplary wireless communication network, in accordance with certain embodiments.

FIG. 5 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE in a cellular or mobile communication system. UE 110 may also be a radio communication device, target device, D2D UE, machine-type-communication UE or UE capable of machine to machine communication (M2M), low-cost and/or low-complexity UE, a sensor equipped with UE, PDA, Tablet, iPad, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

As used herein, the term "network node" may refer to a radio network node or another network node, for example a core network node, MSC, Mobility Management Entity (MME), Operations & Management (O&M), OSS, Self-Organizing Network (SON), positioning node (e.g. E-SMLC), Minimization of Drive Tests (MDT) node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 9-13.

Although FIG. 5 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone).

Furthermore, although certain embodiments may be described as implemented in a LTE network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to UTRA, E-UTRA, narrow band internet of things (NB-IoT), WiFi, Bluetooth, next generation RAT (NR), 4G, 5G, LTE, LTE-Advanced, UMTS, HSPA, GSM, cdma2000, WCDMA, WiMax, UMB, another suitable radio access technology, or any suitable combination of one or more radio access technologies. Any of the first and the second nodes may be capable of supporting a single or multiple RATs. Although certain embodiments may be described in the context of wireless transmissions in the downlink, the present disclosure contemplates that the various embodiments are equally applicable in the uplink.

As used herein, the term time resource used herein may correspond to any type of physical resource or radio resource expressed in terms of length of time. Examples of time resources include, but are not limited to: symbol, time slot, subframe, radio frame, transmission time interval (TTI), interleaving time, etc.

As used herein, the term "radio measurement" may refer to any measurement performed on radio signals. Radio measurements can be absolute or relative. Radio measurements can be, for example, intra-frequency, inter-frequency, CA, etc. Radio measurements can be unidirectional (e.g., DL or UL) or bidirectional (e.g., Round Trip Time (RTT), Receive-Transmit (Rx-Tx), etc.). Some examples of radio measurements include, but are not limited to: timing measurements (e.g., Time of Arrival (TOA), timing advance, RTT, Reference Signal Time Difference (RSTD), SSTD, Rx-Tx, propagation delay, etc.), angle measurements (e.g., angle of arrival), power-based measurements (e.g., received signal power, reference signal received power (RSRP), received signal quality, reference signal received quality (RSRQ), signal to interference plus noise ratio (SINR), signal-to-noise ratio (SNR), channel state information (CSI), channel quality indicator (CQI), precoding matrix indicator (PMI), interference power, total interference plus noise, Received Signal Strength Indicator (RSSI), noise power, etc.), cell detection or identification, beam detection or beam identification, system information reading, Radio Link Management (RLM), etc.

As used herein, the term SRS may refer to any type of reference signal (RS) or more generally physical radio signals transmitted by the UE in the UL to enable the network node to determine the UL signal quality (e.g. UL SNR, SINR, etc.). Examples of such reference signals include, but are not limited to: sounding reference signals, demodulation reference signals (DMRS), UE specific reference or pilot signals, etc. The embodiments are applicable to any type of RS (i.e., switching of carrier transmitting any type of RS).

In some embodiments, the terms "SRS switching" and "SRS carrier-based switching" may be used interchangeably to describe transmitting SRS on different carriers. SRS switching may be based on a time and/or frequency domain pattern. SRS switching may further involve SRS transmission types described above or other SRS transmission types. More example scenarios are described below.

The term random access used herein may be a non-contention based PRACH transmission. In one example, the PRACH transmission may be over SRS Secondary Cell, SCell, without PUSCH (i.e., SCell not configured with PUSCH). The PRACH is transmitted for enabling the network node estimate the timing advance parameter for the Timing Advance Group (TAG) which contains the SCell without PUSCH. In general, the random access related to SRS switching may be contention-based or non-contention based, and may be performed, for example, on SCell, PSCell, or PCell.

Example Scenarios

Example Deployment Scenarios Involving SRS Carrier Based Switching

An example of the basic scenario involves a UE being served by a first network node with a primary serving cell (e.g., PCell) operating on a first carrier frequency (f1). The UE is also capable of being served by at least one secondary serving cell (i.e., SCell) also known as a first SCell. The UE may be capable of being served by two or more SCells (e.g., the first SCell operates on a second carrier frequency (f2) and the second SCell operates on a third carrier frequency (f3)). The same applies for more than two SCells. The carrier f1 may be interchangeably referred to as Primary CC, PCC, while carriers f2, f3, . . . , f(n) may be interchangeably referred to as Secondary CC, SCC1, SCC2, . . . , SCC(n−1) etc., respectively.

In one example, all f1, f2, and f3 belong to the licensed spectrum. Other combinations are also possible. In yet another example, the carrier f1 and f3 belong to a licensed spectrum or band, whereas f2 belongs to an unlicensed spectrum or frequency band. In an unlicensed spectrum or band, contention based transmission is allowed (i.e., two or more devices (e.g., UE or network nodes) can access even the same part of spectrum based on certain fairness constraints (e.g., Listen Before Talk (LBT)). In this case, no operator (or user or transmitter) owns the spectrum. In a licensed spectrum or licensed band, only contention free transmission is allowed (i.e., only devices (e.g., UE or network nodes) allowed by the owner of the spectrum license can access the licensed spectrum). In one example of the use case, all carriers can be in unlicensed spectrum, or in a license shared spectrum, or in a spectrum where LBT is required.

In one example, the CCs and the corresponding serving cells of a UE may be comprised all in the same node. In another example, at least two of the CCs may be comprised in different nodes. The different nodes may be co-located or non-collocated.

In one example, all the CCs and the corresponding serving cells of a UE may be configured in the same Timing Advance Group, TAG, (e.g., pTAG). In another example some CCs and the corresponding serving cells of a UE may be configured in one TAG (e.g., pTAG) and the remaining CCs may be configured in another TAG (e.g., sTAG). In yet another example, the UE may be configured with 2 or more TAGs.

The above scenarios may also comprise DC or multi-connectivity operation performed based on corresponding CA configurations, where PSCell in different embodiments may belong, for example, to a set of SCells.

In a further example, the first and the second SRS transmissions may have different SRS types. In another example, when the first and/or the second SRS transmission is comprising SRS switching transmission it has aperiodic SRS type (and may be triggered by SRS switching configuration); while when the first and/or the second SRS transmission is comprising a non SRS switching transmission it may or may not have aperiodic SRS type.

The SRS switching may be controlled by the network and/or by the UE.

Switching among carriers and/or antennas during SRS switching may also cause some interruptions, for example to PCell or activated SCell, which may be due to UE reconfiguration such as configuring and/or activating target carriers (to which the SRS transmission is switched to), deconfiguring and/or deactivating source carriers (from which SRS transmission is switched), delays, reduced performance, etc.

Example UE Capabilities Involving SRS Carrier Based Switching

In certain embodiments, SRS switching herein is SRS transmissions over N multiple carriers for a specific purpose, where M<N, M is the UE capability of simultaneous/overlapping transmissions and N is the number of carriers with SRS transmissions.

According to certain embodiments, the SRS switching further involves K<M carriers where K carriers may not be used for switching to/from (e.g., may not need to be activated/deactivated prior/after the SRS transmission).

In certain embodiments, SRS carrier switching herein is SRS switching for N-K carriers.

Further Examples Scenarios for SRS Carrier Based Switching

SRS switching (also known as "switching SRS transmissions" described above with respect to FIG. 5 and the term SRS) may involve at least one of:
- starting a first SRS transmission(s) (or starting/resuming the using the corresponding SRS configuration); and
- stopping a second SRS transmission(s) (or stopping/suspending the SRS transmission using the corresponding SRS configuration).

The first and second SRS transmissions may be on the same or different carrier frequencies and/or from the same or different one or more antennas or antenna ports. The same or different carrier frequencies may belong to licensed and/or unlicensed spectrum, the same RAT or different RATs. At least one of the first and the second transmissions comprise an SRS switching transmission, but one of the first and the second transmissions may be SRS transmissions not comprising an SRS switching transmission but affected by the SRS switching transmission.

In one example, the second SRS transmission (comprising a non-SRS switching transmission) is configured on the same carrier before the first SRS transmission (comprising SRS switching transmission) is transmitted.

In another example, the first and the second SRS transmissions comprise SRS switching transmissions, and the switching is from the second to the first SRS transmission, which may be on different carriers.

In yet another example, the first SRS transmission is a non-SRS switching transmission and it is transmitted after the second SRS transmission (comprising an SRS switching transmission) is switched (e.g., to another carrier and/or antenna port (and is thus stopped or suspended on this carrier and/or antenna port).

In yet another example, the first and the second SRS transmissions comprise SRS switching transmissions, and the switching is from the second SRS transmission to the first SRS transmission, which may be on different antenna ports while on the same or different carriers.

In still another example, SRS switching may comprise carrier-based SRS switching and/or antenna-based SRS switching.

In a further example, the first and the second SRS transmissions may comprise different SRS types.

In another example, when the first and/or the second SRS transmission comprises an SRS switching transmission, it has aperiodic SRS type (and may be triggered by SRS switching configuration); while when the first and/or the second SRS transmission comprises a non-SRS switching transmission it may or may not has aperiodic SRS type.

The SRS switching may be controlled by the network and/or by the UE.

Switching among carriers and/or antennas during SRS switching may also cause some interruptions (e.g., to PCell or activated SCell), which may be due to UE reconfiguration such as configuring and/or activating target carriers (to which the SRS transmission is switched to), deconfiguring and/or deactivating source carriers (from which SRS transmission is switched), delays, reduced performance, etc.

Figure 6:
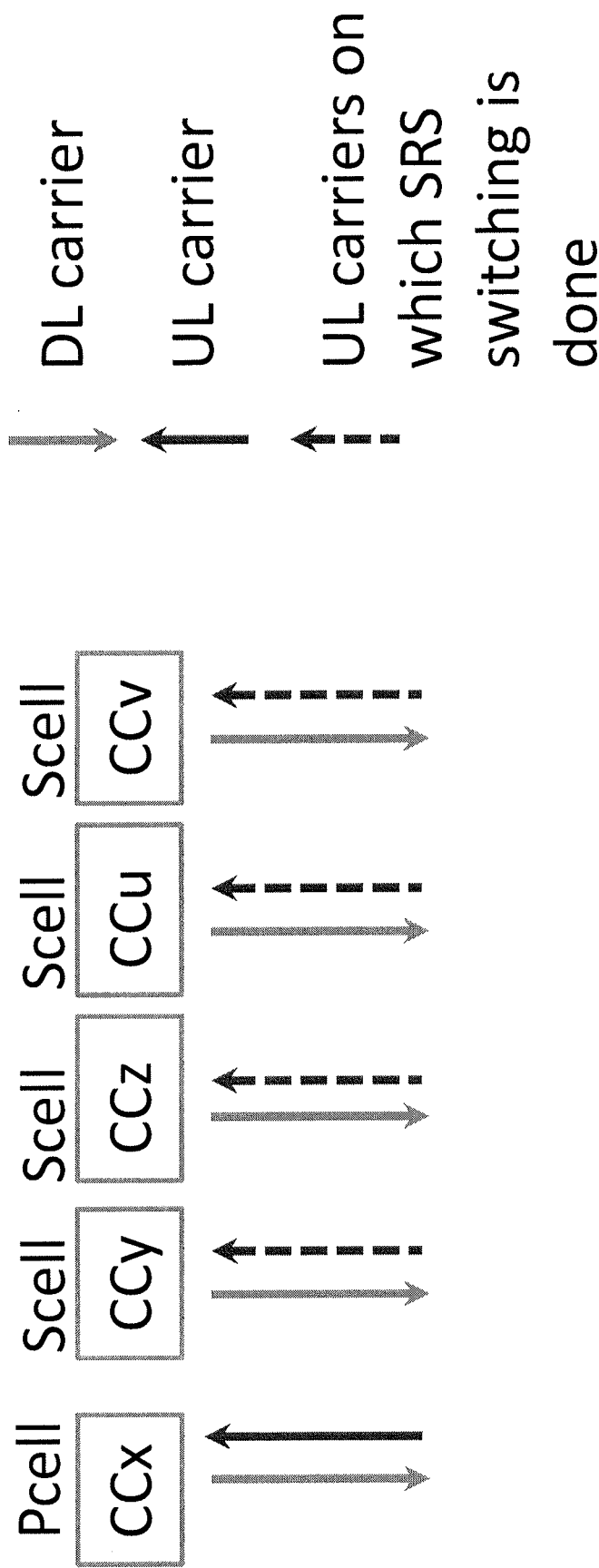
FIG. 6 illustrates an example configuration for SRS carrier-based switching, in accordance with certain embodiments.

FIG. 6 illustrates an example configuration for SRS carrier-based switching, in accordance with certain embodiments. More particularly, FIG. 6 illustrates an example configuration with 5 DL CA and 2 UL (or more UL) carrier aggregation for SRS carrier-based switching. The example of FIG. 6 illustrates a 5DL CA together with 2 UL CA, where one UL is fixed in the PCell and the SRS switching is done on one of the SCells (e.g., from SCell1 to SCell2). So, at any point of time, it's a 2UL CA combination. The same example scenario an also be shown with other numbers of aggregated CCs in DL and UL, respectively. In some cases, the carriers (i.e., CCy, CCz, CCu and CCv) can be in different bands. For example, CCy can be in any band below 1 GHz, CCz can be in any band around 2 GHz and CCu can be any band in 3.5 GHz. In the example of FIG. 6, the CA combinations can be TDD-TDD and/or FDD-TDD.

In an unlicensed spectrum or band, the contention-based transmission is allowed (i.e., two or more devices (e.g., UE or network nodes) can access even the same part of spectrum based on certain fairness constraints (e.g., LBT)). In this case, no operator (or user or transmitter) owns the spectrum. In a licensed spectrum or licensed band only contention free transmission is allowed (i.e., only devices (e.g., UE or network nodes) allowed by the owner of the spectrum license can access the licensed spectrum).

As used herein, the term "served" or "being served" means that the UE is configured with the corresponding serving cell and can receive from and/or transmit data to the network node on the serving cell (e.g., on PCell or any of the SCells). The data is transmitted or received via physical channels (e.g., PDSCH in DL, PUSCH in UL, etc.).

The UE may be requested to switch SRS transmission to one or more serving cells in any suitable manner. For example, in some cases the UE may be requested to switch SRS transmission to one or more serving cells by the network. In some embodiments, one or more SRS switching messages or commands may be received by the UE via Radio Resource Control (RRC) signaling. In some embodiments, one or more SRS switching messages or commands may be received by the UE via Medium Access Control (MAC) Control Element (CE) command.

For example, in certain embodiments one or more of the following signaling examples may apply:
- Receiving a first serving cell SRS switching request message or command from a second network node for switching SRS carrier from the first serving cell;
- Receiving a second serving cell SRS switching request message or command from a third network node for switching SRS carrier from the second serving cell;
- Receiving a third serving cell SRS switching request message or command from a fourth network node for switching SRS carrier from the third serving cell;

In some embodiments, at least some of the first, second, third and fourth network nodes are the same or are co-located at the same site or location. For example, in such embodiments the UE may receive one or more messages or command for switching SRS carrier(s) from one or more serving cells from the first network node. Also, for example, in such embodiments the UE may receive one or more messages for SRS switching of one or more serving cells from the PCell.

In some embodiments, the any combination of the first, second, third and fourth network nodes are different and may be located at different sites or location or may be logically different nodes that may still be co-located. In such embodiments, the UE may receive one or more messages for SRS carrier switching from one or more serving cells from the respective serving cells.

Although the various embodiments described herein are described for at least one serving cell in unlicensed spectrum (or in some cases for 2 serving cells with one on licensed and one on unlicensed spectrum or frequency bands), the present disclosure is not limited to these examples. Rather, the present disclosure contemplates that the various embodiments described herein are applicable to any suitable scenarios, including those involving any number of serving cells in which at least one serving cell operates on a Component Carrier, CC, belonging to an unlicensed spectrum or frequency band. The various embodiments described herein are also applicable for at least one or more serving cells in unlicensed spectrum where all involved serving cells are in unlicensed spectrum.

Methods in a UE

In certain embodiments, methods in a UE are disclosed. According to one example embodiment, the method comprises the steps of:

Step 1: Indicating to another node the UE's ability to adapt a RA procedure in relation to SRS switching.

Step 2: Determining at least a first set of reference time resources (R1) in at least one cell (cell1) belonging to at least a first carrier frequency (F1).

In certain embodiments, determining at least the first set of reference time resources (R1) may comprise adapting R1 to a RA procedure or configuration.

Step 3: Sending one or more random access transmissions on a second carrier frequency (F2) to support SRS carrier-based switching, while accounting for the determined first set of reference time resources (R1).

In certain embodiments, sending one or more random access transmissions on the second carrier frequency (F2) may comprise using transmitter resources associated with the first carrier frequency (F1).

In certain embodiments, the method may comprise indicating to another node that the random access configuration and/or procedure has been adapted.

The various steps of the example embodiment are described in more detail below. Additional information is included in the description of the methods in a network node described below.

Step 1

In this step, the UE may indicate to another node the UE's ability to adapt RA procedure in relation to SRS switching.

The UE may indicate its capability to the another node in any suitable manner (for example, via signalling). The another node may be any suitable node (for example, a network node or another UE). The capability may be indicated in any suitable manner. For example, in certain embodiments the UE may send its capability information to the another node. As another example, in certain embodiments the UE may send an indication of its capability to the another node.

The UE may send its capability information to the another node at any suitable time. For example, in certain embodiments, the capability may be sent upon a request or triggering event or condition, or upon receiving a certain message from another node.

Step 2

In this step, the UE may determine at least a first set of reference time resource (R1) in at least one cell (cell1) belonging to at least a first carrier frequency (F1).

In one example, F1 may comprise a serving cell. F1 may be activated or deactivated, if configured for CA. In another example, F1 may be inter-frequency or inter-RAT carrier.

In one further embodiment, the UE may also determine R1 adaptively to RA.

The reference time resources R1 may comprise, for example, one or more of:

DL and/or UL resources with specific type and/or purpose of signals (e.g., positioning signals, system information, Discovery Reference Signal (DRS), Primary Synchronization Signal (PSS)/Secondary Synchronization Signal (SSS), Channel State Information Reference Signal (CSI-RS), SRS, broadcast channels such as Physical Broadcast Channel (PBCH), channels with system information (e.g., System Information Block 1 (SIB1)/Master Information Block (MIB)/SIB2 . . . , etc.);

Resources indicated by a pattern (e.g., time-domain restricted measurement subframes pattern, Positioning Reference Signal (PRS) subframe pattern, etc.).

Resources during ON duration when the UE is in discontinuous reception (DRX)/extended DRX (eDRX);

Special subframes (e.g., TDD special subframes);

Subframes #0 and #5, which typically contain critical signals and where the UE typically performs measurements;

The resources during a specific time interval (e.g., necessary to complete a measurement);

The UL resources for sending UE feedback (e.g., ACK/NACK) determined in a pre-defined way (e.g., n+k) by when the UE receives a message in DL (e.g., in subframe n); and Measurement gaps during which the UE performs measurements or an operation on F1.

The determining may be based on any suitable criteria. In certain embodiments, the determining may be based on one or more of:

Message or indication from another node, obtained via unicast, multicast or broadcast, via physical layer and/or higher layers;

Measurement configuration;

UE activity configuration (e.g., DRX cycle length, ON duration state length, etc.);

DRS or DRS Measurement Timing Configuration (DMTC) configuration;

Pre-defined rule or table or requirement (such as based on a standard); and

History.

Step 3

In this step, the UE may send one or more random access (RA) transmissions on a second carrier frequency (F2) to support SRS carrier-based switching, while accounting for the determined first set of reference time resources (R1).

More specifically, the UE may adaptively perform non-contention based PRACH transmission over SRS SCell without PUSCH to minimize the impact on time resources on another cell used by the UE for performing measurements.

In certain embodiments, the UE may also determine a second set of time resources (R2) associated with RA transmissions. The second set of time resources (R2) may comprise any one or both of:

the time when the interruptions may occur (e.g., activation or deactivation time of F2, switching time to and from F2, etc.); and the time resources with RA transmissions.

Examples of RA transmissions include, but are not limited to: RA preamble transmissions or retransmissions.

In certain embodiments, the UE may use for the sending the transmitter resources associated with another carrier frequency which may be F1 or another carrier frequency.

In certain embodiments, the UE may account for the determined first set of reference time resources (R1), for example by adapting one or more of RA configuration or procedure parameters (see e.g., the parameters described above in the background section) and/or measurement configuration or procedure.

The adaptation may be any suitable adaptation. For example, in certain embodiments the adaptation may comprise, for example, one or more of:

Adapting transmission occasions of RA transmissions and the number of RA transmissions;

Delaying the random access transmission to F2 for certain time period in order to avoid/minimize/reduce the interruption on at least R1;

Avoiding/minimizing/reducing the overlap of R1 and R2;

Ensuring some time gap (e.g., at least above a threshold such as 1 subframe or n symbols) between the closest resources of R1 and R2;

Adapting activation and/or deactivation time of F2 related to the RA transmissions;

No interruption occurs (e.g., on cell1, of F1 during R1);

Interruption does not occur in R1 more than X % of the time etc.;

No interruption (e.g., on cell1, during R1 such that UE meets a first set of measurement requirements (M1) of cells on F1);

Limited amount of interruptions is allowed on, for example, cell1, during R1 such that UE meets a second measurement requirements (M2) of cells on F1; M2 is less stringent than M1;

Configuring RA L1 parameters so that the probability of RA retransmissions is reduced;

Not switching from F2 until the RA is complete (i.e., staying on the carrier until the RA procedure is complete, including all RA retransmissions);

Reducing the number of switchings from F2 during the RA procedure, for example for some (e.g., the first RA transmission) or all RA transmissions not switching from F2 for a certain time until the time when the response is expected and performing a retransmission if needed;

Restricting the maximum number of RA retransmissions in relation to SRS switching;

Restricting the maximum number of RA retransmissions in relation to SRS switching during which the UE needs to stay on F2;

Adapting the PRACH transmission (e.g., non-contention based RA) over SRS SCell without PUSCH to ensure that at least certain number of time resources are available during certain time period at the UE for performing the measurement. This rule is further described by the following examples:

Adapting PRACH transmission (e.g., non-contention based RA) over SRS SCell without PUSCH to ensure that at least N1 number of time resources are available per time period (T1) at the UE in the serving cell for radio link monitoring. According to a pre-defined rule the UE meets pre-defined requirements (e.g., RLM, out of sync and in sync) provided that at least N1 number of time resources are available per T1 at the UE in the serving cell for RLM. Examples of N1 and T1 include 1 subframe and radio frame, respectively.

Adapting PRACH transmission (e.g., non-contention based RA) over SRS SCell without PUSCH to ensure that at least N2 number of time resources are available per time period (T2) at the UE in the measured cell for doing radio measurement (e.g., RSRP, RSRQ, RS-SINR, etc.) According to a pre-defined rule the UE meets pre-defined requirements (e.g., RSRP) provided that at least N2 number of time resources are available per T2 at the UE in the serving cell for RLM. Examples of N2 and T2 are 1 subframe and radio frame, respectively.

Adapting PRACH transmission (e.g., non-contention based RA) over SRS SCell without PUSCH to ensure that at least N3 number of specific type of time resources are available per time period (T3) at the UE in the measured cell for doing radio measurement (e.g., cell search, CGI acquisition etc.). According to a pre-defined rule the UE meets pre-defined requirements (e.g., cell identification delay) provided that at least one of the subframe #0 and subframe #5 are available per T3 at the UE in the cell to be identified. Example of T3 is radio frame.

Step 4

In certain embodiments, the UE may indicate to another node that the random access configuration and/or procedure was been adapted.

Methods in a Network Node

In certain embodiments, methods in a network node are disclosed. According to one example embodiment, the method comprises the steps of:

Step 1: Obtaining information about a UE's ability to adapt a RA procedure in relation to SRS switching.

Step 2: Determining for the UE at least a first set of reference time resource (R1) in at least one cell (cell1) belonging to at least a first carrier frequency (F1)

In certain embodiments, determining for the UE at least a first set of reference time resource (R1) may comprise adapting R1 to random access procedure or configuration Step 3: Controlling one or more of: the UE's RA transmissions on a second carrier frequency (F2) to support SRS carrier-based switching; and the UE's operation in the determined first set of reference time resources (R1).

The various steps of the example embodiment are described in more detail below. Additional information is included in the description of the methods in a UE described above.

Step 1

In this step, the network node may obtain the information about the UE's ability to adapt RA procedure in relation to SRS switching.

The network node may obtain the information about the UE's capability in any suitable manner. For example, in certain embodiments obtaining the information about the UE's capability may comprise autonomously determining by the network node the UE's ability to adapt RA procedure in relation to SRS switching. As another example, the UE may receive the UE's capability information or an indication of the UE's capability information from the UE or another node (e.g., another network node).

In certain embodiments, the obtaining may be based, for example, on a message received from the UE or from another node (e.g., serving BS).

If the UE is not capable of adapting RA procedure, then the adaptation of RA procedure/configuration and/or set of resources R1 or associated procedure/operation configuration may be performed by the network node.

Step 2

In this step, the network node may determine for the UE at least a first set of reference time resource (R1) in at least one cell (cell1) belonging to at least a first carrier frequency (F1).

The UE may also determine a second set of time resources R2 associated with RA transmissions. The set R2 may comprise any one or both:
- the time when the interruptions may occur (e.g., activation or deactivation time of F2, switching time to and from F2, etc.); and
- the time resources with RA transmissions.

See some examples of R1 and methods of adapting above (describing methods in a UE).

Step 3

In this step, the network node may control one or more of: the UE's RA transmissions on a second carrier frequency (F2) to support SRS carrier-based switching; and the UE's operation in the determined first set of reference time resources (R1).

In certain embodiments, the controlling may comprise adapting of RA procedure/configuration and/or UE's operation associated with R1. See example methods of adaptation described above (describing methods in a UE).

In some embodiments, the controlling may also comprise determining a second set of time resources (R2) associated with the RA transmissions. The second set of time resources (R2) may also comprise the time when the interruptions may occur or are allowed (e.g., activation or deactivation time of F2, switching time to and from F2, etc.).

In certain embodiments, the controlling may further comprise sending a message to the UE comprising one or more of: RA related configuration (see description in Background and description of embodiments above), R2 configuration, operation configuration associated with R1, or R1 configuration. The sending may be via unicast, multicast or broadcast, via physical layer and/or higher layers.

Proposed Changes to the Standard

The following sections can be modified in 3GPP TS 36.133 v14.1.0:

7.6 Radio Link Monitoring 7.6.1 Introduction

The UE shall meet the radio link monitoring requirements specified for PSCell in section 7.6 provided that the UE is configured with the parameters T313, N313 and N314 defined in [2]. The UE shall monitor the downlink link quality based on the cell-specific reference signal in order to detect the downlink radio link quality of the PCell and PSCell as specified in [3]. The UE shall estimate the downlink radio link quality and compare it to the thresholds $Q_{out}$ and $Q_{in}$ for the purpose of monitoring downlink radio link quality of the PCell and PSCell. The threshold $Q_{out}$ is defined as the level at which the downlink radio link cannot be reliably received and shall correspond to 10% block error rate of a hypothetical PDCCH transmission taking into account the PCFICH errors with transmission parameters specified in Table 7.6.1-1.

The threshold $Q_{in}$ is defined as the level at which the downlink radio link quality can be significantly more reliably received than at $Q_{out}$ and shall correspond to 2% block error rate of a hypothetical PDCCH transmission taking into account the PCFICH errors with transmission parameters specified in Table 7.6.1-2.

When higher-layer signalling indicates certain subframes for restricted radio link monitoring, the radio link quality shall be monitored as specified in [3].

The requirements in sections 7.6.2.1, 7.6.2.2 and 7.6.2.3 shall also apply when a time domain measurement resource restriction pattern for performing radio link monitoring measurements is configured by higher layers (TS 36.331 [2]), with or without CRS assistance information, provided that also the following additional condition is fulfilled:

The time domain measurement resource restriction pattern configured for the measured cell indicates at least one subframe per radio frame for performing the radio link monitoring measurements, When the CRS assistance information is provided, the transmission bandwidth [30] in all intra-frequency cells in the CRS assistance information [2] is the same or larger than the transmission bandwidth of the PCell for which radio link monitoring is performed.

When the CRS assistance information is provided, the requirements in Section 7.6 shall also be met when the number of transmit antenna ports [16] of one or more cells whose CRS assistance information is provided [2] is different from the number of transmit antenna ports of the cell for which radio link monitoring is performed.

NOTE: If the UE is not provided with the CRS assistance information (TS 36.331 [2]) or the CRS assistance data is not valid throughout the entire evaluation period, then similar Release 8 and 9 requirements apply for time domain measurements restriction under colliding CRS with ABS configured in non-MBSFN subframes.

The UE capable of SRS carrier based switching when configured to perform non-contention based PRACH transmission over SRS SCell without PUSCH shall perform radio link monitoring and meet the requirements defined in Section 7.6 provided the following condition is met:

at least one downlink subframe is available for doing radio link monitoring at the UE in the PCell.

8.1.2.7 E-UTRAN E-CID Measurements 8.1.2.7.1 E-UTRAN FDD UE Rx-Tx Time Difference Measurements When no DRX is used the physical layer measurement period of the UE Rx-Tx time difference measurement shall be 200 ms.

When DRX is used in RRC_CONNECTED state the physical layer measurement period ($T_{measure\_FDD\_UE\_Rx\_Tx1}$) of the UE Rx-Tx time difference measurement shall be as specified in table 8.1.2.7.1-1. When eDRX_CONN is used in RRC_CONNECTED state, the physical layer measurement period ($T_{measure\_FDD\_UE\_Rx\_Tx1}$) of the UE Rx-Tx time difference measurement shall be as specified in table 8.1.2.7.1-2.

TABLE 8.1.2.7.1-1

FDD UE Rx-Tx time difference measurement requirement when DRX is used

| DRX cycle length (s) | $T_{measure\_FDD\_UE\_Rx\_Tx1}$ (s) (DRX cycles) |
| --- | --- |
| ≤0.04 | 0.2 (Note1) |
| 0.04 < DRX-cycle ≤ 2.56 | Note2 (5) |

(Note1):
Number of DRX cycle depends upon the DRX cycle in use

Note2:
Time depends upon the DRX cycle in use

TABLE 8.1.2.7.1-2

FDD UE Rx-Tx time difference measurement
requirement when eDRX_CONN is used

| eDRX_CONN cycle length (s) | $T_{measure\_FDD\_UE\_Rx\_Tx1}$ (s) (eDRX_CONN cycles) |
|---|---|
| 2.56 < eDRX_CONN cycle ≤ 10.24 | Note (5) |

Note:
Time depends upon the eDRX_CONN cycle in use

If the UE is performing UE Rx-Tx time difference measurement while the PCell is changed due to the handover then the UE shall restart the Rx-Tx measurement on the new cell. In this case the UE shall also meet the UE Rx-Tx time difference measurement and accuracy requirements. However the physical layer measurement period of the UE Rx-Tx measurement shall not exceed $T_{measure\_FDD\_UE\_Rx\_Tx3}$ as defined in the following expression:

$$T_{measure\_FDD\_UE\_Rx\_Tx3} = (K+1)*(T_{measure\_FDD\_UE\_Rx\_Tx1}) + K*T_{PCell\_change\_handover}$$

Where:
  K is the number of times the PCell is changed over the measurement period ($T_{measure\_FDD\_UE\_Rx\_Tx3}$),
  $T_{PCell\_change\_handover}$ is the time necessary to change the PCell due to handover; it can be up to 45 ms.

If the UE supporting E-UTRA carrier aggregation when configured with the secondary component carrier(s) is performing UE Rx-Tx time difference measurement while the PCell is changed regardless whether the primary component carrier is changed or not then the UE shall restart the Rx-Tx measurement on the new PCell. In this case the UE shall also meet the UE Rx-Tx time difference measurement and accuracy requirements corresponding to the new PCell. However the physical layer measurement period of the UE Rx-Tx measurement shall not exceed $T_{measure\_FDD\_UE\_Rx\_Tx2}$ as defined in the following expression:

$$T_{measure\_FDD\_UE\_Rx\_Tx2} = (N+1)*(T_{measure\_FDD\_UE\_Rx\_Tx1}) + N*T_{PCell\_Change\_CA}$$

Where:
  N is the number of times the PCell is changed over the measurement period ($T_{measure\_FDD\_UE\_Rx\_Tx2}$),
  $T_{PCell\_change\_CA}$ is the time necessary to change the PCell; it can be up to 25 ms.

If IDC autonomous denial is configured then the UE shall also meet the requirements, provided not more than 30 IDC autonomous denial subframes are configured over an IDC autonomous denial validity period of at least 200 ms.
The UE capable of SRS carrier based switching when configured to perform to perform non-contention based PRACH transmission over SRS SCell without PUSCH shall perform radio link monitoring and meet the requirements defined in Section 8.1.2.7 provided the following condition is met:
  at least one downlink subframe and one uplink subframe are available for doing UE Rx-Tx time difference measurement at the UE in the PCell.
The measurement accuracy for the UE Rx-Tx time difference measurement when DRX or eDRX_CONN is used as well as when no DRX is used shall be as specified in the sub-clause 9.1.9.

8.3 Measurements for E-UTRA Carrier Aggregation
8.3.1 Introduction
Requirements in this clause are applicable to UE supporting E-UTRA FDD, E-UTRA TDD and/or E-UTRA TDD-FDD carrier aggregation.
Non configured frequencies may be measured with measurement gaps or autonomous gaps according to the requirements in clause 8.1.2.3 (E-UTRAN inter frequency measurements and E-UTRAN inter frequency measurements with autonomous gaps).
For UE, which does not support simultaneous reception and transmission for inter-band TDD CA specified in TS 36.331, and is compliant to the requirements for inter-band CA with uplink in one E-UTRA band and without simultaneous Rx/Tx specified in TS 36.101, the inter-band CA requirements in Section 8.3 shall apply also with different TDD UL/DL subframe configurations and/or different special subframe configurations used in CCs of different bands, under the following additional conditions:
  UE is not simultaneously scheduled in UL and DL on the different CCs, and
  at least DL subframe #0 or DL subframe #5 are available for measurements in the measured cell.
The UE capable of SRS carrier based switching when configured to perform to perform non-contention based PRACH transmission over SRS SCell without PUSCH shall meet the requirements defined in Section 8.3 provided the following condition is met:
  at least DL subframe #0 or DL subframe #5 per radio frame is available for measurements at the UE in the measurement cell.

8.4 OTDOA RSTD Measurements for E-UTRAN Carrier Aggregation
8.4.1 Introduction
This clause contains RSTD measurement requirements on UE capabilities for support of E-UTRA carrier aggregation. Requirements in this clause are applicable to all carrier aggregation capable UE which have been configured with one or two downlink Scell(s). Non-configured frequencies may be measured with measurement gaps according to the requirements in clause 8.1.2.6, i.e., E-UTRAN inter-frequency RSTD measurement period applies. Requirements in this clause are applicable for E-UTRA FDD, E-UTRA TDD and E-UTRA TDD-FDD carrier aggregation.
For UE, which does not support simultaneous reception and transmission for inter-band TDD CA specified in TS 36.331 [2], and is compliant to the requirements for inter-band CA with uplink in one E-UTRA band and without simultaneous Rx/Tx specified in TS 36.101 [5], RSTD requirements in Section 8.4 shall apply also with different TDD UL/DL subframe configurations and/or different special subframe configurations used in CCs of different bands, under the following additional conditions:
  all positioning subframes indicated in the OTDOA assistance data and specified in Section 9.1.10 are available for RSTD measurements in the measured and reference cells; and
  UE is not simultaneously scheduled in UL and DL on the different CCs.
The UE capable of SRS carrier based switching when configured to perform to perform non-contention based PRACH transmission over SRS SCell without PUSCH shall meet the requirements defined in Section 8.4 provided the following condition is met:

all positioning subframes indicated in the OTDOA assistance data and specified in Section 9.1.10 are available for RSTD measurements at the UE in the measured and reference cells 8.4.3 Measurements on a Secondary Component Carrier The RSTD measurements when all cells are on a configured secondary component carrier shall meet all applicable requirements (FDD or TDD) specified in clause 8.1.2.5, i.e., E-UTRAN intra-frequency RSTD measurement period applies, regardless of whether the Scell on the corresponding frequency is activated or deactivated by the MAC-CE commands as specified in [17].

The RSTD measurement accuracy for all the measurements on the secondary component carrier shall be fulfilled according to the accuracy as specified in the sub-clause 9.1.12.

A UE may reconfigure receiver bandwidth taking into account the SCell activation/deactivation status, non-contention based PRACH transmission over SRS SCell without PUSCH if capable of SRS carrier based switching, and when making RSTD measurements on cells belonging to SCC with deactivated SCell. This may cause interruptions (packet drops) to a PCell when the PCell and the SCell belong to the adjacent or non-adjacent component carriers in the same frequency band or to different frequency bands. In this case, the UE shall follow the interruption requirements specified in Section 7.10. No interruption to the PCell shall be allowed during the PRS positioning occasion on the PCell.

8.8 Measurements for E-UTRA Dual Connectivity 8.8.1 Introduction

This clause contains requirements for UE supporting E-UTRA dual connectivity. Requirements in this clause are applicable to UEs which have been configured with one SCell in either MCG or SCG and one PSCell for inter-band dual connectivity. Requirements in this clause are applicable to E-UTRA FDD, E-UTRA TDD and E-UTRA TDD-FDD dual connectivity.

The UE capable of SRS carrier based switching when configured to perform to perform non-contention based PRACH transmission over SRS SCell without PUSCH shall meet the requirements defined in Section 8.8 provided the following condition is met:

at least DL subframe #0 or DL subframe #5 per radio frame is available for measurements at the UE in the measurement cell.

8.12 Discovery Signal Measurements for E-UTRA Carrier Aggregation Under Operation with Frame Structure 3

8.12.1 Introduction

This section contains requirements on UE capabilities for support of E-UTRA carrier aggregation under operation with frame structure 3.

Non configured frequencies may be measured with measurement gaps according to the requirements in Section 8.11.2.2 and Section 8.11.3.2.

The requirements in Section 8.12 shall apply for E-UTRA carrier aggregation of one FDD PCell or one TDD PCell and SCell on one SCC, where the SCC is following the frame structure type 3 [16].

8.12.2 CRS Based Discovery Signal Measurements for E-UTRA Carrier Aggregation 8.12.2.1 Introduction The requirements in Section 8.12.2 shall apply for CRS based discovery signal measurements comprising RSRP and RSRQ measurements [4].

The UE capable of SRS carrier based switching when configured to perform to perform non-contention based PRACH transmission over SRS SCell without PUSCH shall meet the requirements defined in Section 8.12.2 provided the following condition is met:

minimum number of configured discovery signal occasions containing CRS based discovery signal as specified in section 8.12.2 is available for measurements at the UE in the measurement cell.

8.12.3 Requirements for CSI-RS Based Discovery Signal Measurements for E-UTRA Carrier Aggregation 8.12.3.1 Introduction The requirements in Section 8.12.3 shall apply for CSI-RS based discovery signal measurements comprising CSI-RSRP measurements [4].

The UE capable of SRS carrier based switching when configured to perform to perform non-contention based PRACH transmission over SRS SCell without PUSCH shall meet the requirements defined in Section 8.12.3 provided the following condition is met:

minimum number of configured discovery signal occasions containing CSI-RS based discovery signal as specified in section 8.12.3 is available for measurements at the UE in the measurement cell.

Figure 7:
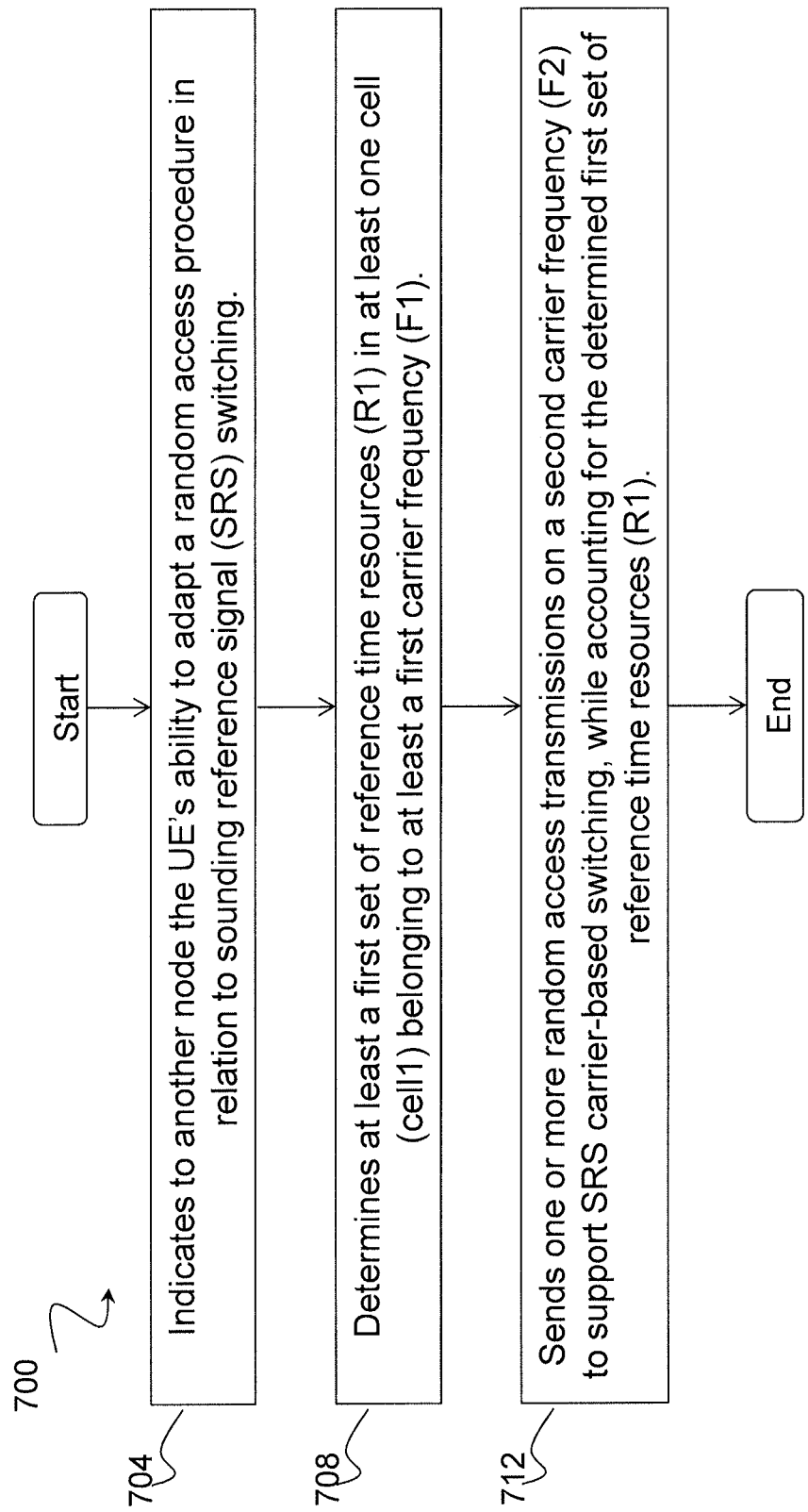
FIG. 7 is a flow diagram of a method in a user equipment, in accordance with certain embodiments.

FIG. 7 is a flow diagram of a method in a user equipment, in accordance with certain embodiments. The method begins at step 704, where the UE indicates to another node the UE's ability to adapt a random access procedure in relation to sounding reference signal (SRS) switching. At step 708, the UE determines at least a first set of reference time resources (R1) in at least one cell (cell1) belonging to at least a first carrier frequency (F1). In certain embodiments, determining at least the first set of reference time resources (R1) may comprise adapting R1 to one or more of a random access procedure or configuration.

At step 712, the user equipment sends one or more random access transmissions on a second carrier frequency (F2) to support SRS carrier-based switching, while accounting for the determined first set of reference time resources (R1). In certain embodiments, sending the one or more random access transmissions on the second carrier frequency (F2) may comprise using transmitter resources associated with F1. In certain embodiments, the method may comprise indicating to another node that the random access configuration and/or procedure has been adapted.

Figure 8:
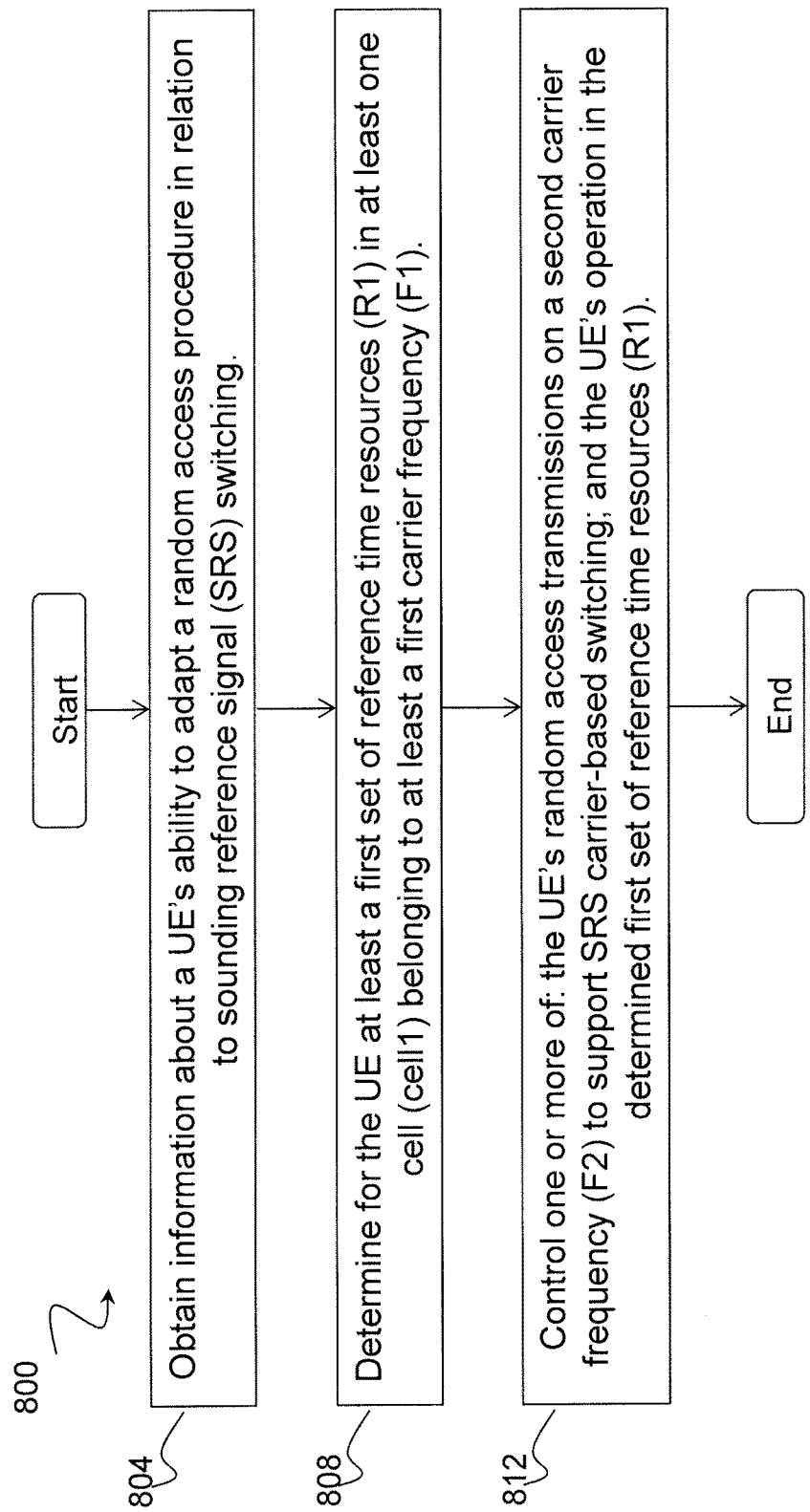
FIG. 8 is a flow diagram of a method in a network node, in accordance with certain embodiments.

FIG. 8 is a flow diagram of a method in a network node, in accordance with certain embodiments. The method begins at step 804, where the network node obtains information about a UE's ability to adapt a random access procedure in relation to sounding reference signal (SRS) switching. At step 808, the network node determines for the UE at least a first set of reference time resources (R1) in at least one cell (cell1) belonging to at least a first carrier frequency (F1). In certain embodiments, determining for the UE at least the first set of reference time resources (R1) may comprise adapting R1 to one or more of a random access procedure or configuration.

At step 812, the network node controls one or more of: the UE's random access transmissions on a second carrier frequency (F2) to support SRS carrier-based switching; and the UE's operation in the determined first set of reference time resources (R1).

Figure 9:
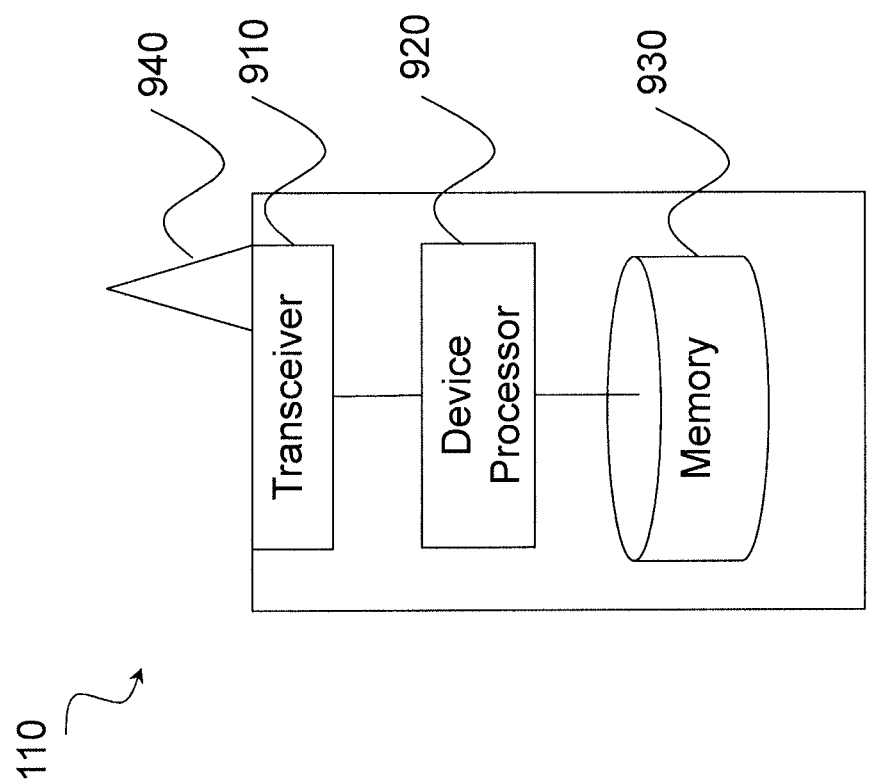
FIG. 9 is a block schematic of an exemplary wireless device, in accordance with certain embodiments.

FIG. 9 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 910, processor 920, and memory 930. In some embodiments, transceiver 910 facilitates transmitting wireless signals to and receiving wireless signals from network node 115 (e.g., via antenna 940), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110, such as the functions of wireless device 110 described above in relation to FIGS. 1-8. In some embodiments, processor 920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
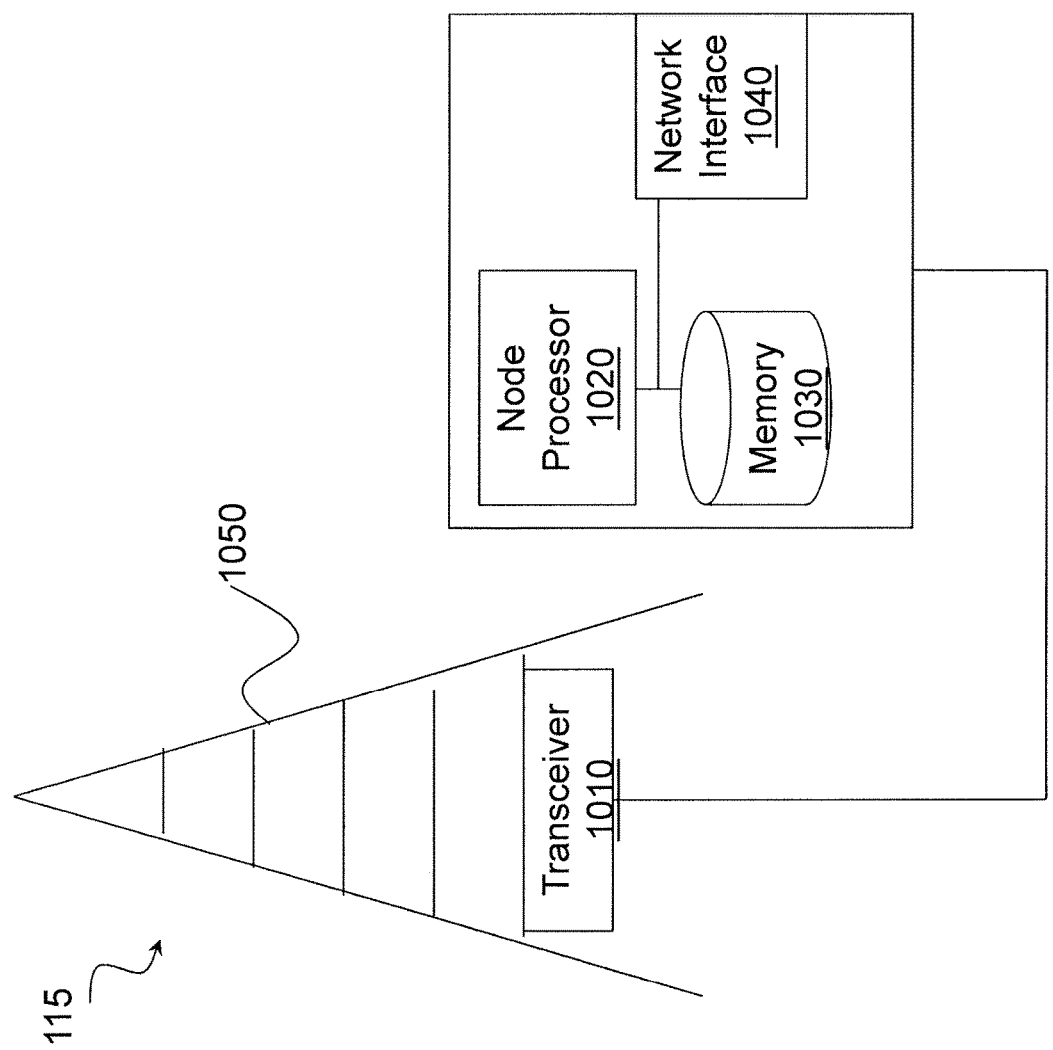
FIG. 10 is a block schematic of an exemplary network node, in accordance with certain embodiments.

FIG. 10 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via antenna 1050), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, Public Switched Telephone Network (PSTN), core network nodes or radio network controllers 130, etc.

Processor 1020 may include any suitable combination of hardware and software implemented in one or more modules to execute instructions and manipulate data to perform some or all of the described functions of network node 115, such as those described above in relation to FIGS. 1-8 above. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
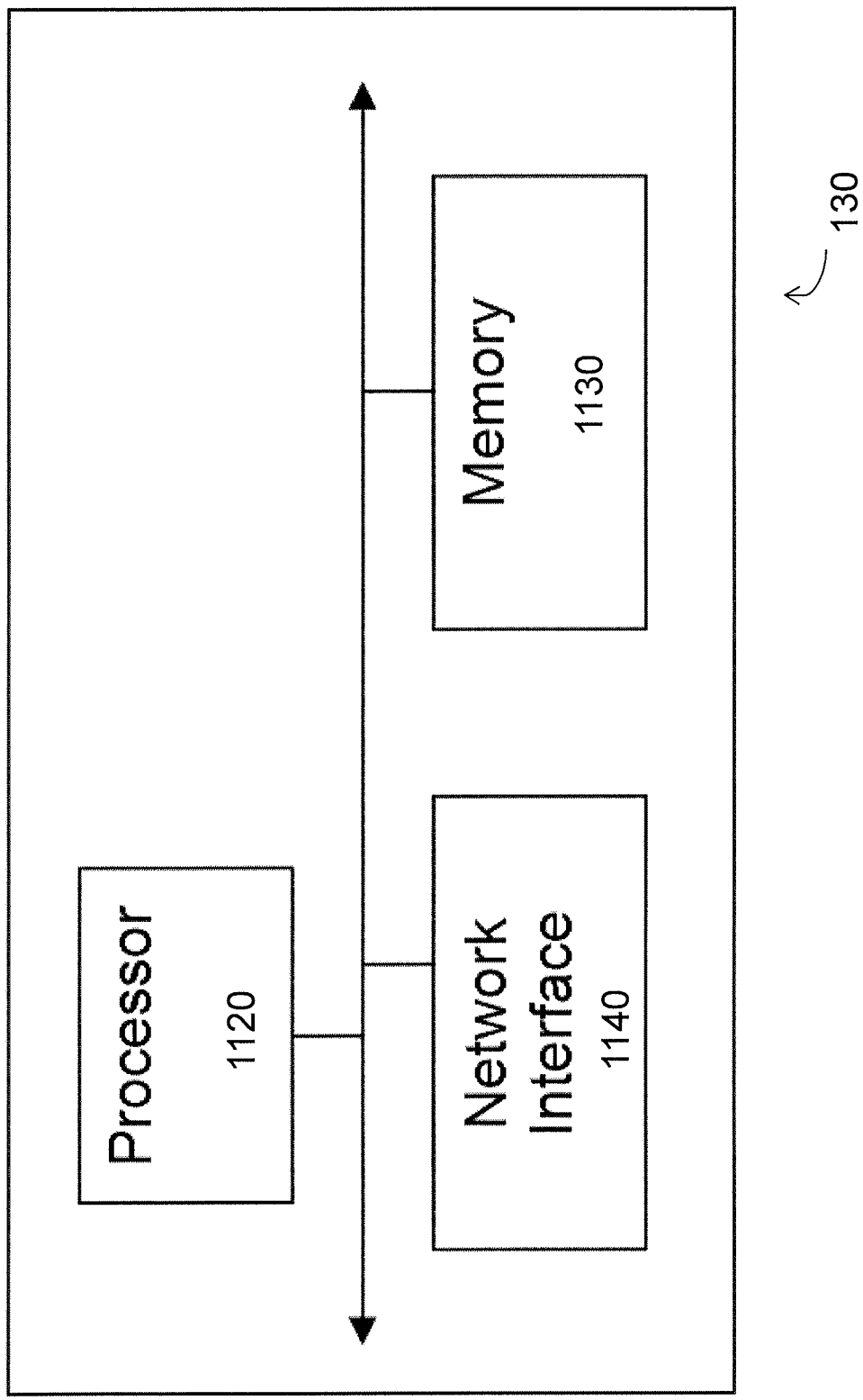
FIG. 11 is a block schematic of an exemplary radio network controller or core network node, in accordance with certain embodiments.

FIG. 11 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes 130, etc.

Processor 1120 may include any suitable combination of hardware and software implemented in one or more modules to execute instructions and manipulate data to perform some or all of the described functions of the radio network controller or core network node 130. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
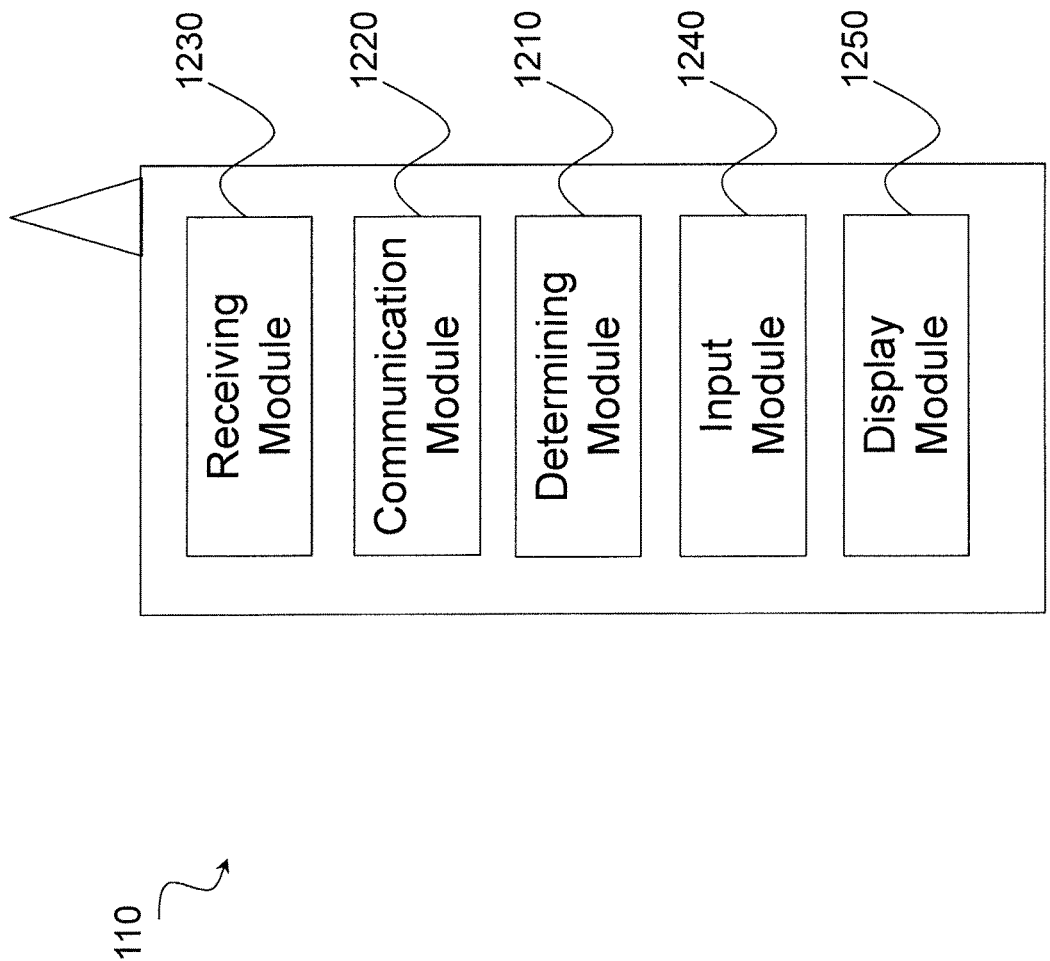
FIG. 12 is a block schematic of an exemplary wireless device, in accordance with certain embodiments.

FIG. 12 is a block schematic of an exemplary wireless device, in accordance with certain embodiments. Wireless device 110 may include one or more modules. For example, wireless device 110 may include a determining module 1210, a communication module 1220, a receiving module 1230, an input module 1240, a display module 1250, and any other suitable modules. Wireless device 110 may perform the methods for adapting random access configuration to control interruptions associated with SRS carrier-based switching described above with respect to FIGS. 1-8.

Determining module 1210 may perform the processing functions of wireless device 110. For example, determining module 1210 may determine at least a first set of reference time resources (R1) in at least one cell (cell1) belonging to at least a first carrier frequency (F1). As another example, determining module 1210 may adapt the first set of reference time resources (R1) to one or more of a random access procedure or configuration. Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 described above may, in certain embodiments, be performed in one or more distinct modules.

Communication module 1220 may perform the transmission functions of wireless device 110. For example, communication module 1220 may indicate to another node the UE's ability to adapt a random access procedure in relation to SRS switching. As another example, communication module 1220 may send one or more random access transmissions on a second carrier frequency (F2) to support SRS carrier-based switching, while accounting for the determined first set of reference time resources (R1). In certain embodiments, communication module 1220 may use transmitter resources associated with the first carrier frequency (F1). As still another example, communication module 1220 may indicate to another node that the random access configuration and/or procedure has been adapted. Communication module 1220 may transmit messages to one or more of network nodes 115 of network 100. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210. In certain embodiments, the functions of communication module 1220 described above may be performed in one or more distinct modules.

Receiving module 1230 may perform the receiving functions of wireless device 110. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210.

Input module 1240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1210.

Display module 1250 may present signals on a display of wireless device 110. Display module 1250 may include the display and/or any appropriate circuitry and hardware configured to present signals on the display. Display module 1250 may receive signals to present on the display from determining module 1210.

Determining module 1210, communication module 1220, receiving module 1230, input module 1240, and display module 1250 may include any suitable configuration of hardware and/or software. Wireless device 110 may include additional modules beyond those shown in FIG. 12 that may be responsible for providing any suitable functionality, including any of the functionality described above and/or any additional functionality (including any functionality necessary to support the various solutions described herein).

Figure 13:
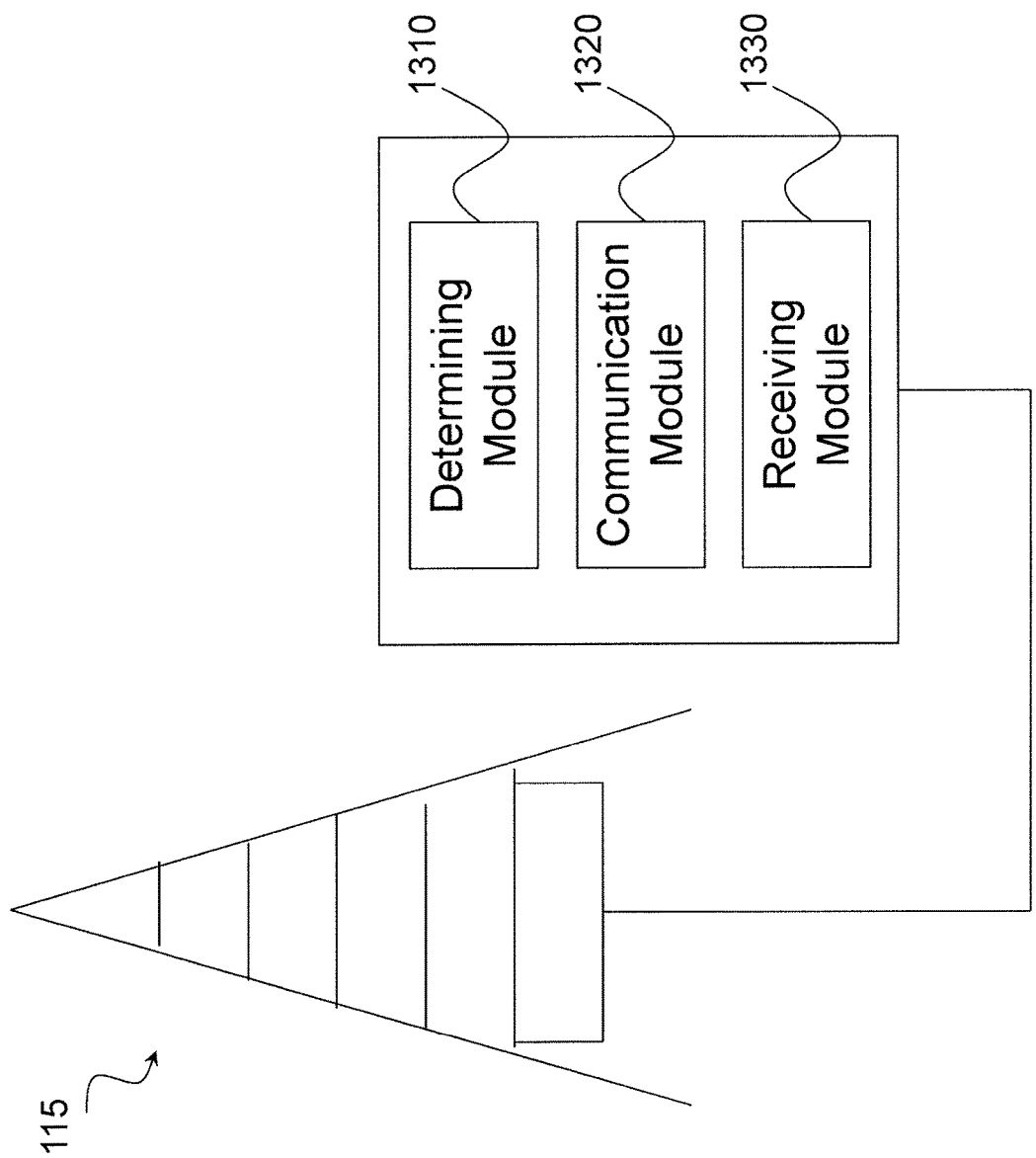
FIG. 13 is a block schematic of an exemplary network node, in accordance with certain embodiments.

FIG. 13 is a block schematic of an exemplary network node 115, in accordance with certain embodiments. Network node 115 may include one or more modules. For example, network node 115 may include determining module 1310, communication module 1320, receiving module 1330, and any other suitable modules. In some embodiments, one or more of determining module 1310, communication module 1320, receiving module 1330, or any other suitable module may be implemented using one or more processors, such as processor 1020 described above in relation to FIG. 10. In certain embodiments, the functions of two or more of the various modules may be combined into a single module. Network node 115 may perform the methods for adapting random access configuration to control interruptions associated with SRS carrier-based switching described above with respect to FIGS. 1-8. Determining module 1310 may perform the processing functions of network node 115.

For example, determining module 1310 may obtain information about a UE's ability to adapt a random access procedure in relation to SRS switching. As another example, determining module 1310 may determine for the UE at least a first set of reference time resources (R1) in at least one cell (cell1) belonging to at least a first carrier frequency (F1). As still another example, determining module 1310 may adapt the first set of reference time resources (R1) to one or more of a random access procedure or configuration. As yet another example, determining module 1310 may control one or more of: the UE's random access transmissions on a second carrier frequency (F2) to support SRS carrier-based switching; and the UE's operation in the determined first set of reference time resources (R1). Determining module 1310 may include or be included in one or more processors, such as processor 1020 described above in relation to FIG. 10. Determining module 1310 may include analog and/or digital circuitry configured to perform any of the functions of determining module 1310 and/or processor 1020 described above. The functions of determining module 1310 may, in certain embodiments, be performed in one or more distinct modules. For example, in certain embodiments some of the functionality of determining module 1310 may be performed by an allocation module.

Communication module 1320 may perform the transmission functions of network node 115. Communication module 1320 may transmit messages to one or more of wireless devices 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310 or any other module.

Receiving module 1330 may perform the receiving functions of network node 115. For example, receiving module 1330 may obtain information about a UE's ability to adapt a random access procedure in relation to SRS switching. Receiving module 1330 may receive any suitable information from a wireless device. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310 or any other suitable module.

Determining module 1310, communication module 1320, and receiving module 1330 may include any suitable configuration of hardware and/or software. Network node 115 may include additional modules beyond those shown in FIG. 13 that may be responsible for providing any suitable functionality, including any of the functionality described above and/or any additional functionality (including any functionality necessary to support the various solutions described herein).

Figure 14:
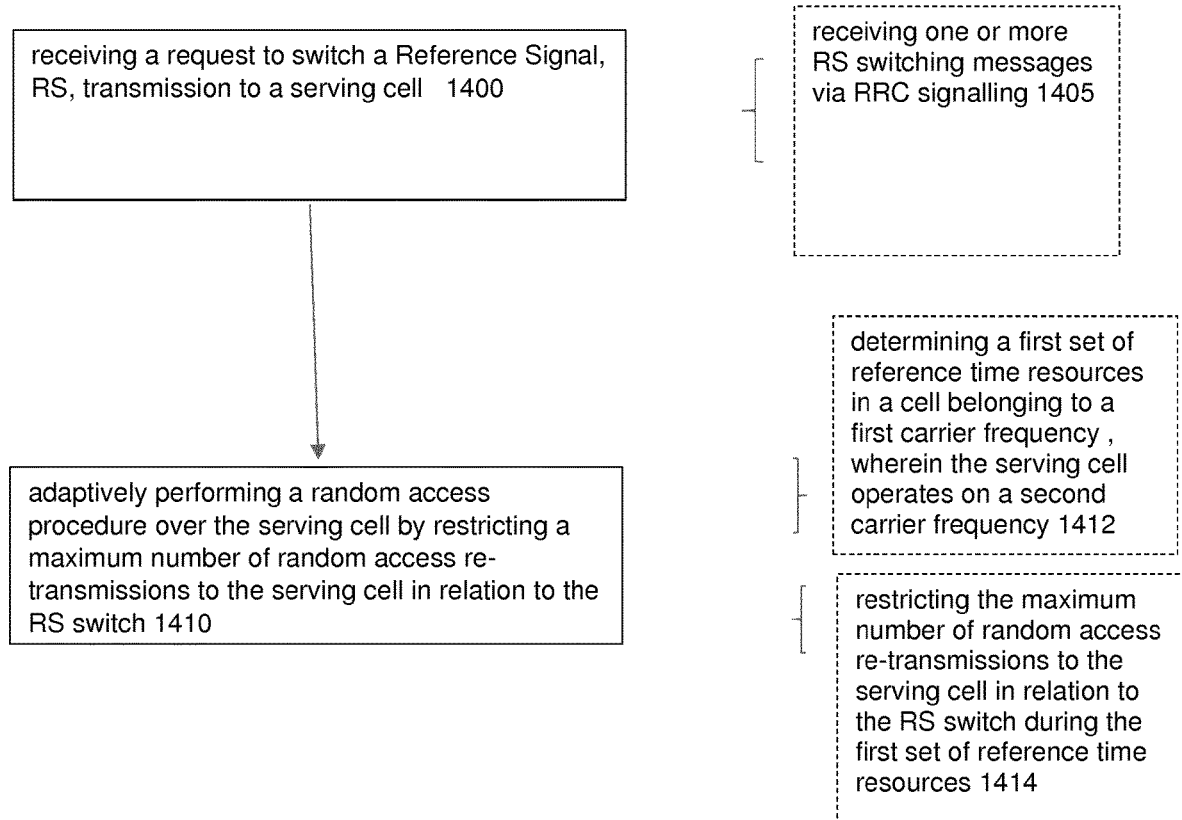
FIG. 14 is a flow diagram of a method in a user equipment, in accordance with certain embodiments.

FIG. 14 shows a flow chart of a method in a User Equipment for performing a random access procedure according to embodiments. The method comprises at 1400 receiving a request to switch a Reference Signal, RS, transmission to a serving cell. The method further comprises at 1410 adaptively performing a random access procedure over the serving cell by restricting a maximum number of random access re-transmissions to the serving cell in relation to the RS switch.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The method may further comprise determining at 1412 a first set of reference time resources in a cell belonging to a first carrier frequency, wherein the serving cell operates on a second carrier frequency. In this embodiment, restricting 1410 the maximum number of random access re-transmissions to the serving cell may comprise at 1414 restricting the maximum number of random access re-transmissions to the serving cell during the determined first set of reference time resources. The first set of reference time resources may be for performing measurements. That is, the first set of reference time resources may be used by the user equipment for performing measurements.

The step of receiving 1400 a request to switch RS transmission to a serving cell may comprise at 1405 receiving one or more RS switching messages via Radio Resource Control, RRC, signaling.

The RS switch may be a carrier-based RS switch.

The reference signal, RS, may be a Sounding Reference Signal, SRS. However, the RS may be any type of reference signal such as but not limited to a Demodulation Reference Signal, DMRS, a UE specific reference signal or a pilot signal.

Figure 15:
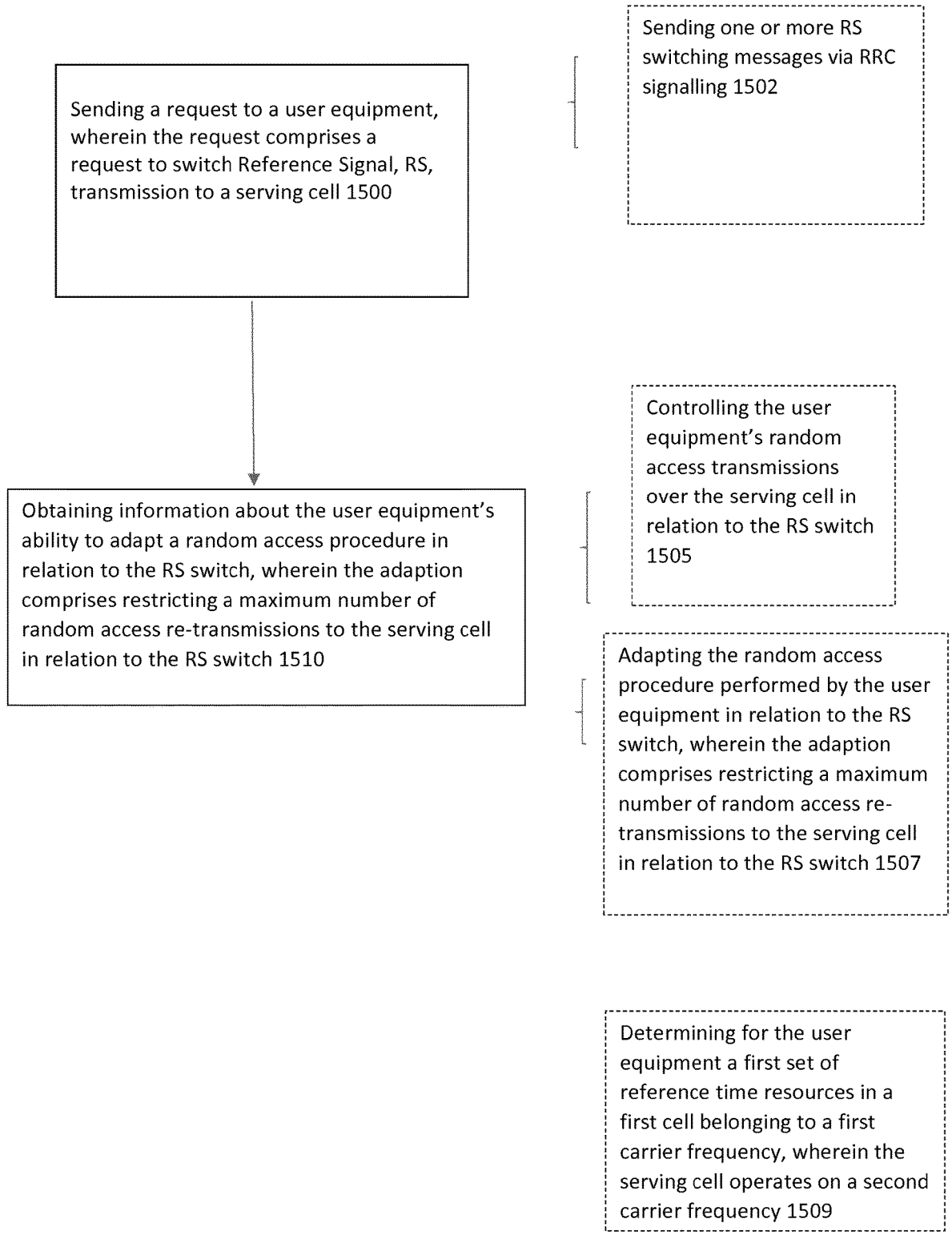
FIG. 15 is a flow diagram of a method in a network node, in accordance with certain embodiments.

FIG. 15 shows flow chart of a method in a network node according to embodiments. The method may comprise at 1500 sending a request to a user equipment, wherein the request comprises a request to switch Reference Signal, RS, transmission to a serving cell. The method further comprises at 1510 obtaining information about the user equipment's ability to adapt a random access procedure in relation to the Reference Signal, RS, switch, wherein the adaption comprises restricting a maximum number of random access re-transmissions to the serving cell in relation to the RS switch.

The method in the network node may further comprise at 1505 controlling the user equipment's random access transmissions over the serving cell in relation to the RS switch. This controlling may comprise at 1507 adapting the random access procedure performed by the user equipment in relation to the RS switch, wherein the adaption comprises restricting a maximum number of random access re-transmissions to the serving cell in relation to the RS switch.

The method in the network node may further comprise at 1509 determining for the user equipment a first set of reference time resources in a first cell belonging to a first carrier frequency, wherein the serving cell operates on a second carrier frequency.

Step 1500, sending the request to the user equipment, may comprise at 1502 sending one or more RS switching messages via Radio Resource Control, RRC, signaling.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

The wireless device, 110 which may also be referred to as a user equipment, described above with respect to FIGS. 9 and 12 may be configured to perform the method described above with respect to FIG. 14.

According to embodiments there is provided a user equipment comprising one or more processors. The one or more processors are configured to receive a request to switch a Reference Signal, RS, transmission to a serving cell. The one or more processors are further configured to adaptively perform a random access procedure over the serving cell by restricting a maximum number of random access re-transmissions to the serving cell in relation to the RS switch.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The one or more processor may be further configured to determine a first set of reference time resources in a cell belonging to a first carrier frequency, wherein the serving cell operates on a second carrier frequency. The one or more processors may be configured to restrict the maximum number of random access re-transmissions to the serving cell during the determined first set of reference time resources. The first set of reference time resources may be for use in performing measurements.

The one or more processors may be configured to receive a request to switch RS transmission to a serving cell by receiving one or more RS switching messages via Radio Resource Control, RRC, signaling.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

The network node 115 described above with respect to FIGS. 10 and 13 may be configured to perform the method described above with respect to FIG. 15.

According to embodiments there is provided a network node comprising one or more processors. The one or more processors are configured to send a request to a user equipment, wherein the request comprises a request to switch Reference Signal, RS, transmission to a serving cell. The one or more processors are further configured to obtain information about the user equipment's ability to adapt a random access procedure in relation to the Reference Signal, RS, switch, wherein the adaption comprises restricting a maximum number of random access re-transmissions to the serving cell in relation to the RS switch.

The one or more processors may be further configured to control the user equipment's random access transmissions over the serving cell in relation to the RS switch. In particular, the one or more processors may be configured to adapt the random access procedure performed by the user equipment in relation to the RS switch, wherein the adaption comprises restricting a maximum number of random access re-transmissions to the serving cell in relation to the RS switch.

The one or more processors may further be configured to determine for the user equipment a first set of reference time resources in a first cell belonging to a first carrier frequency, wherein the serving cell operates on a second carrier frequency.

In some embodiments, the one or more processors may be configured to send one or more RS switching messages to the user equipment via Radio Resource Control, RRC, signaling.

The random access re-transmissions may be random access preamble re-transmissions. The serving cell may be a Secondary serving cell, Scell, without Physical Uplink Shared Channel, PUSCH. The random access procedure may be a non-contention based Physical Random Access Channel, PRACH, procedure, and the random access re-transmissions may be non-contention based PRACH transmissions.

The RS switch may be a carrier-based RS switch.

The RS may be a Sounding Reference Signal. However, the RS may be any type of reference signal such as but not limited to a Demodulation Reference Signal, DMRS, a UE specific reference signal or a pilot signal.

Certain embodiments of the present disclosure may provide one or more technical advantages. For example, certain embodiments may reduce the risk of additional interruptions due to random access in relation to RS carrier-based switching. Embodiments may reduce interruptions or in other words the impact on a first set of time resources in a first cell belonging to a first carrier frequency used for radio measurements. Thus, embodiments may reduce degradation of performance of procedures. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method, in a User Equipment, for performing a random access procedure, the method comprising:
   receiving a request to switch a Reference Signal, RS, transmission to a serving cell;
   determining a first set of reference time resources in a cell belonging to a first carrier frequency, wherein:
   the serving cell operates on a second carrier frequency; and
   the first set of reference time resources is for performing measurements; and
   performing a random access procedure over the serving cell by restricting a maximum number of random access preamble re-transmissions to the serving cell, wherein restricting the maximum number of random access preamble re-transmissions to the serving cell comprises restricting the maximum number of random access preamble re-transmissions to the serving cell during the determined first set of reference time resources based on the determined first set of reference time resources.

2. A method according to claim 1, wherein the serving cell is a Secondary serving cell, Scell, without Physical Uplink Shared Channel, PUSCH.

3. A method according to claim 1, wherein the random access procedure is a non-contention based Physical Random Access Channel, PRACH, procedure, and the random access preamble re-transmissions are non-contention based PRACH transmissions.

4. A method, in a network node, comprising:
   sending a request to a user equipment, wherein the request comprises a request to switch Reference Signal, RS, transmission to a serving cell;
   determining, for the user equipment, a first set of reference time resources in a first cell belonging to a first carrier frequency, wherein:
   the serving cell operates on a second carrier frequency; and
   the first set of reference time resources is for performing measurements; and
   obtaining information about the user equipment's ability to adapt a random access procedure, wherein the adaption comprises restricting a maximum number of random access preamble re-transmissions to the serving cell during the determined first set of reference time resources based on the determined first set of reference time resources.

5. A user equipment comprising one or more processors, wherein the one or more processors is configured to:
   receive a request to switch a Reference Signal, RS, transmission to a serving cell;
   determine a first set of reference time resources in a cell belonging to a first carrier frequency, wherein:
   the serving cell operates on a second carrier frequency; and
   the first set of reference time resources is for performing measurements; and
   perform a random access procedure over the serving cell by restricting a maximum number of random access preamble re-transmissions to the serving cell, wherein restricting the maximum number of random access preamble re-transmissions to the serving cell comprises restricting the maximum number of random access preamble re-transmissions to the serving cell during the determined first set of reference time resources based on the determined first set of reference time resources.

6. A user equipment according to claim 5, wherein the serving cell is a Secondary serving cell, Scell, without Physical Uplink Shared Channel, PUSCH.

7. A user equipment according to claim 5, wherein the random access procedure is a non-contention based Physical Random Access Channel, PRACH, procedure, and the random access preamble re-transmissions are non-contention based PRACH transmissions.

8. A user equipment according to claim 5, wherein the one or more processors are configured to receive a request to switch RS transmission to a serving cell by receiving one or more RS switching messages via Radio Resource Control, RRC, signaling.

9. A user equipment according to claim 5, wherein the RS switch is a carrier-based RS switch.

10. A user equipment according to claim 5, wherein the RS is a Sounding Reference Signal.

11. A network node comprising one or more processors configured to:
    send a request to a user equipment, wherein the request comprises a request to switch Reference Signal, RS, transmission to a serving cell;
    determine, for the user equipment, a first set of reference time resources in a first cell belonging to a first carrier frequency, wherein:
    the serving cell operates on a second carrier frequency; and
    the first set of reference time resources is for performing measurements; and
    obtain information about the user equipment's ability to adapt a random access procedure, wherein the adaption comprises restricting a maximum number of random access preamble re-transmissions to the serving cell during the determined first set of reference time resources based on the determined first set of reference time resources.

12. A network node according to claim 11, wherein the one or more processors are further configured to control the user equipment's random access transmissions over the serving cell during the determined first set of reference time resources.

13. A network node according to claim 12, wherein the one or more processors are configured to adapt the random access procedure performed by the user equipment, wherein the adaption comprises selectively restricting a maximum number of random access preamble re-transmissions to the serving cell during the determined first set of reference time resources.

14. A network node according to claim 11 wherein the one or more processors are configured to send one or more RS switching messages to the user equipment via Radio Resource Control, RRC, signaling.

15. A network node according to claim 11, wherein the serving cell is a Secondary serving cell, Scell, without Physical Uplink Shared Channel, PUSCH.

16. A network node according to claim 11, wherein the random access procedure is a non-contention based Physical Random Access Channel, PRACH, procedure, and the random access preamble re-transmissions are non-contention based PRACH transmissions.

17. A network node according to claim 11, wherein the RS switch is a carrier-based RS switch.

18. A network node according to claim 11, wherein the RS is a Sounding Reference Signal.

* * * * *